United States Patent
Ahn et al.

(10) Patent No.: US 10,458,397 B2
(45) Date of Patent: Oct. 29, 2019

(54) LOOP LINKED SMART MORPHING ACTUATOR

(71) Applicants: Sung Hoon Ahn, Seongnam-si (KR); Min Woo Han, Seoul (KR)

(72) Inventors: Sung Hoon Ahn, Seongnam-si (KR); Min Woo Han, Seoul (KR)

(73) Assignee: SNU R&DB Foundation, Seoul (KR)

( * ) Notice: Subject to any disclaimer, the term of this patent is extended or adjusted under 35 U.S.C. 154(b) by 436 days.

(21) Appl. No.: 15/441,106

(22) Filed: Feb. 23, 2017

(65) Prior Publication Data
US 2017/0306934 A1    Oct. 26, 2017

(30) Foreign Application Priority Data
Apr. 25, 2016 (KR) .................. 10-2016-0050290

(51) Int. Cl.
*F03G 7/06* (2006.01)
(52) U.S. Cl.
CPC .............. *F03G 7/065* (2013.01); *F03G 7/06* (2013.01)
(58) Field of Classification Search
CPC ................................ F03G 7/06; F03G 7/065
USPC ............................. 60/527–529; 310/306, 307
See application file for complete search history.

(56) References Cited

U.S. PATENT DOCUMENTS

| 5,396,769 | A | * | 3/1995 | Brudnicki | ............... F03G 7/065 60/527 |
| 5,873,906 | A | * | 2/1999 | Lau | ............................. A61F 2/07 128/898 |
| 6,827,743 | B2 | * | 12/2004 | Eisermann | ............. A61B 17/68 623/23.54 |
| 7,056,297 | B2 | | 6/2006 | Dohno et al. | |

(Continued)

FOREIGN PATENT DOCUMENTS

| CN | 1431084 A | 7/2003 |
| CN | 101052570 A | 10/2007 |

(Continued)

OTHER PUBLICATIONS

Yuji Kubota et al.; "Mesh-Like Actuator and Actuator System"; Abstract of JP2007170326 A; Jul. 5, 2007; https://www4.j-platpat.inpit.go.jp.

(Continued)

*Primary Examiner* — Mark A Laurenzi
*Assistant Examiner* — Mickey H France
(74) *Attorney, Agent, or Firm* — Andrew D. Fortney; Central California IP Group, P.C.

(57) ABSTRACT

Disclosed is a loop linked smart morphing actuator. The actuator includes a first area morphed in a first pattern and a second area morphed in a second pattern according to an external signal. The first area includes a first unit cell morphed in a first direction. The second area includes a second unit cell morphed in a second direction. The first unit cell and the second unit cell may be configured in a loop type (Continued)

knit structure. The second direction is opposite to the first direction, the second pattern is a pattern which has a symmetrical relationship with the first pattern and is provided opposite to the first pattern. In regard to a structure or a shape, provided is an actuator including a knit structure for realizing various driving forms which cannot be predicted through predetermined first and second patterns or a simple combination thereof.

20 Claims, 41 Drawing Sheets

(56) References Cited

U.S. PATENT DOCUMENTS

| | | | | |
|---|---|---|---|---|
| 7,669,799 | B2* | 3/2010 | Elzey | B32B 3/28 |
| | | | | 244/123.12 |
| 8,716,920 | B2 | 5/2014 | Kim et al. | |
| 8,810,113 | B2 | 8/2014 | Han et al. | |
| 9,048,034 | B2* | 6/2015 | Petty | H01H 1/12 |
| 9,250,418 | B2 | 2/2016 | Bakke et al. | |
| 9,427,342 | B2* | 8/2016 | Carlson | A61F 2/90 |
| 2003/0125781 | A1 | 7/2003 | Dohno et al. | |
| 2004/0197519 | A1* | 10/2004 | Elzey | B32B 3/28 |
| | | | | 428/68 |
| 2006/0093766 | A1 | 5/2006 | Savicki et al. | |
| 2006/0281382 | A1* | 12/2006 | Karayianni | D03D 1/0088 |
| | | | | 442/181 |
| 2011/0109199 | A1 | 5/2011 | Han et al. | |
| 2012/0162664 | A1 | 6/2012 | Bakke et al. | |
| 2013/0020909 | A1 | 1/2013 | Kim et al. | |
| 2015/0316763 | A1 | 11/2015 | Redding et al. | |
| 2015/0380355 | A1* | 12/2015 | Rogers | H01L 23/538 |
| | | | | 257/773 |

FOREIGN PATENT DOCUMENTS

| | | |
|---|---|---|
| CN | 102099939 A | 6/2011 |
| CN | 102576149 A | 7/2012 |
| CN | 102891249 A | 1/2013 |
| CN | 104233579 A | 12/2014 |
| JP | 2007170326 A | 7/2007 |
| KR | 20130011880 A | 1/2013 |

OTHER PUBLICATIONS

Sung Hoon Ahn et al.; "Smart Soft Composite Actuator"; Abstract of KR20130011880 (A); Jan. 30, 2013; http://kpa.kipris.or.kr.
Office Action dated May 22, 2019, CN Pat. Appl. No. 201710269732.4.

* cited by examiner

LOOP LINKED SMART MORPHING ACTUATOR

CROSS-REFERENCE TO RELATED APPLICATIONS

This application claims the benefit of the Korean Patent Application No. 10-2016-0050290 filed on Apr. 25, 2016, which is hereby incorporated by reference as if fully set forth herein.

BACKGROUND

Field of the Invention

The present invention relates to a loop linked smart morphing actuator, and more particularly, to a loop linked smart morphing actuator for realizing various complex structures.

Discussion of the Related Art

Since an actuator using a smart material realizes an operation such as bending or twisting, the actuator may be easily applied to implementation of a flapping actuator. Therefore, the actuator using the smart material may be applied various fields such as children toys, robots, flexible devices, home appliances, industrial equipment, etc.

The actuator using the smart material has been disclosed in Korean Patent Registration No. 10-1357462.

However, the patent document describes a method of realizing bending or twisting, but does not disclose a method of realizing various driving types at all. Therefore, in regard to a structure or a shape, the related art has a limitation in implementing an actuator for realizing various driving types.

SUMMARY

Accordingly, the present invention is directed to provide a loop linked smart morphing actuator that substantially obviates one or more problems due to limitations and disadvantages of the related art.

An aspect of the present invention is directed to provide a loop linked smart morphing actuator in which a shape is freely morphed in regard to a structure or a shape, thereby generating and realizing various complex structures.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a loop linked smart morphing actuator including a first area morphed in a first pattern according to an external signal and a second area morphed in a second pattern according to the external signal, wherein the first area includes a first unit cell morphed in a first direction, and the first unit is configured in a loop type knit structure including a first wire and a second wire.

The loop linked smart morphing actuator may further include a second area morphed in a second pattern according to the external signal, wherein the second area may include a second unit cell morphed in a second direction, and the second unit cell may be configured in a loop type knit structure including a third wire and a fourth wire.

In the loop linked smart morphing actuator, the second direction may be opposite to the first direction, the second pattern may be a pattern which has a symmetrical relationship with the first pattern and is provided opposite to the first pattern, and the knit structure may be a loop type.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1A:
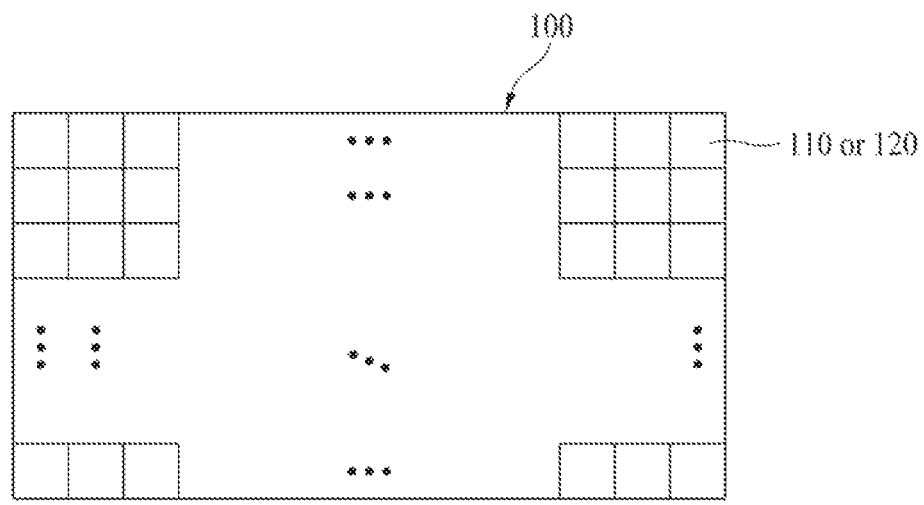
FIG. 1A is a plan view illustrating a first area and a second area according to an embodiment of the present invention.

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, exemplary embodiments of the present invention will be described in detail with reference to the accompanying drawings.

Figure 1B:
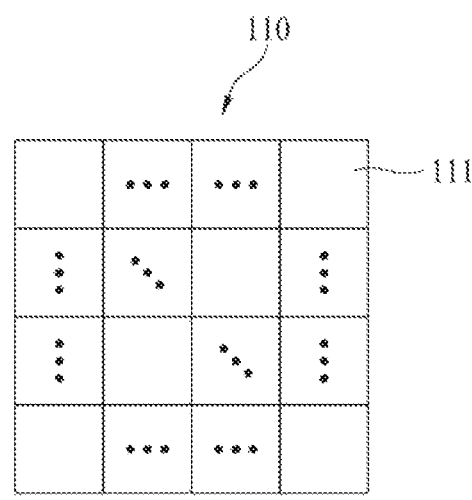
FIG. 1B is a plan view illustrating a relationship between a first area and a first unit cell according to an embodiment of the present invention.
Figure 1C:
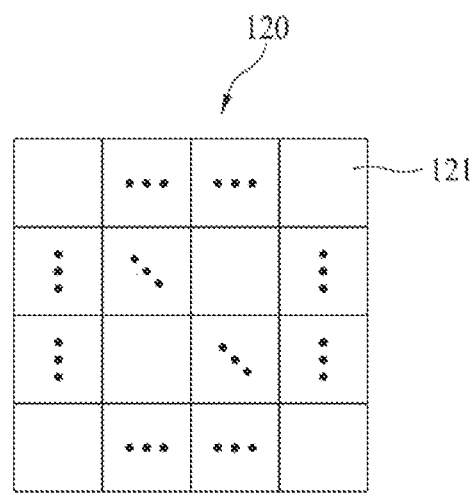
FIG. 1C is a plan view illustrating a relationship between a second area and a second unit cell according to an embodiment of the present invention.
Figure 1D:
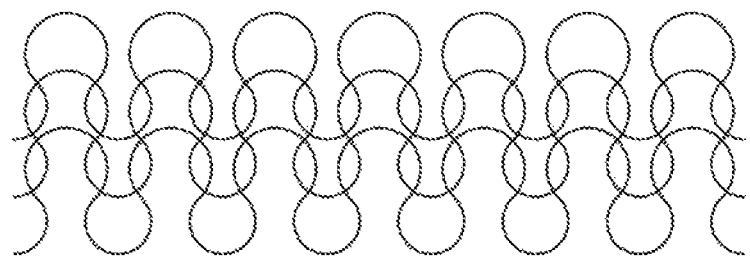
FIG. 1D is a plan view of an actuator according to an embodiment of the present invention.

FIG. 1A is a plan view illustrating a first area 110 and a second area 120 of an actuator 100 according to an embodiment of the present invention. FIG. 1B is a plan view illustrating a relationship between the first area 110 and a first unit cell 111 according to an embodiment of the present invention. FIG. 1C is a plan view illustrating a relationship between the second area 120 and a second unit cell 121 according to an embodiment of the present invention. FIG. 1D is a plan view of the actuator 100 according to an embodiment of the present invention.

As seen in FIG. 1A, the actuator 100 according to an embodiment of the present invention may include one or more first areas 110 or one or more second areas 120. That is, the actuator 100 according to an embodiment of the present invention may be configured with one first area 110, configured with one second area 120, or configured by a combination of the one or more first areas 110 and the one or more second areas 120. As seen in FIG. 1B, the first area 110 may include one or more first unit cells 111. As seen in FIG. 1C, the second area 120 may include one or more second unit cells 121. As seen in FIG. 1D, a type of the actuator 100 where the first area 110 and the second area 120 are combined may have a loop type knit structure.

Figure 2A:
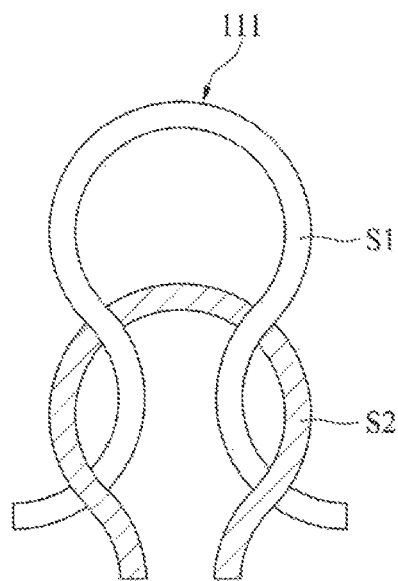
FIG. 2A is a plan view illustrating in detail a first unit cell according to an embodiment of the present invention.
Figure 2B:
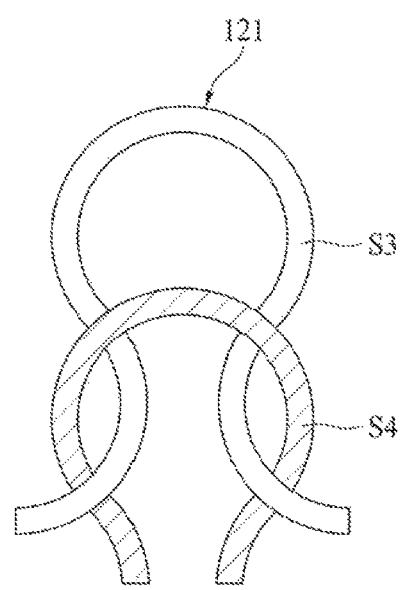
FIG. 2B is a plan view illustrating in detail a second unit cell according to an embodiment of the present invention.
Figure 2C:
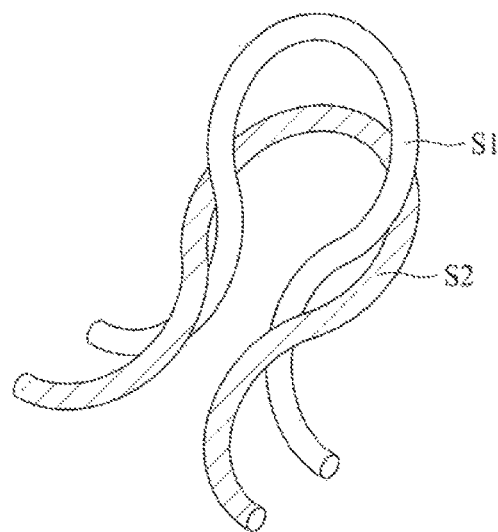
FIG. 2C is a perspective view illustrating in detail a first unit cell according to an embodiment of the present invention.
Figure 2D:
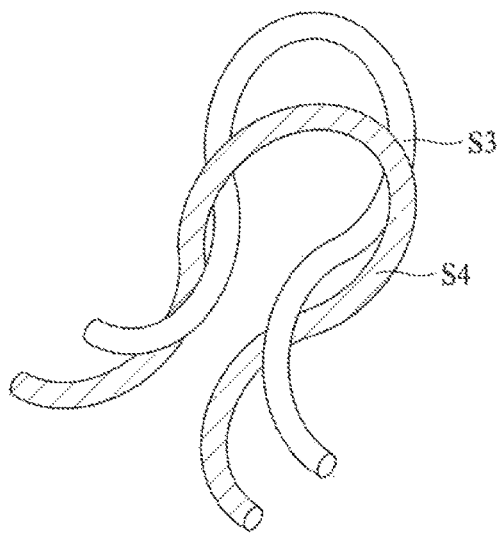
FIG. 2D is a perspective view illustrating in detail a second unit cell according to an embodiment of the present invention.

FIG. 2A is a plan view illustrating in detail a first unit cell 111 according to an embodiment of the present invention. FIG. 2B is a plan view illustrating in detail a second unit cell 121 according to an embodiment of the present invention. FIG. 2C is a perspective view illustrating in detail the first unit cell 111 according to an embodiment of the present invention. FIG. 2D is a perspective view illustrating in detail the second unit cell 121 according to an embodiment of the present invention.

As seen in FIGS. 2A and 2C, the first unit cell 111 may include a first wire S1 and a second wire S2. In the first unit cell 111, the first wire S1 and the second wire S2 may be configured in a knit structure. That is, the first wire S1 and the second wire S2 may be divided for representing a portion where smart materials intersect each other in the knit structure. That is, the first wire S1 and the second wire S2 may have a structure such as a knitted fabric and may be linked to each other.

The first wire S1 and the second wire S2 may have a predetermined arrangement direction. As in FIG. 2A, the arrangement direction of the first wire S1 and the second wire S2 may be a horizontal direction which is a direction in which the first wire S1 and the second wire S2 extend and are linked to unit cells adjacent thereto. In the following embodiments, if not separately described, description will be made on the assumption that the arrangement direction of the first wire S1 and the second wire S2 is the horizontal direction.

The first unit cell 111 may be configured in a loop type knit structure. The first wire S1 and the second wire S2 of the first unit cell 111 may intersect each other in a loop type. If the first wire S1 and the second wire S2 intersect each other in the loop type, the first wire S1 may be disposed over the second wire S2 in a portion which intersection starts and a portion which intersection ends, and the first wire S1 may be disposed under the second wire S2 in a loop intermediate portion which intersection continues.

An empty space may be provided inside the loop type knit structure. Therefore, the first unit cell 111 may shrink to an internal empty space according to an external signal such as a temperature change or an electrical signal. Also, each of loops may be unfolded in the arrangement direction of the first wire S1 and the second wire S2. Accordingly, the first unit cell 111 may expand as a loop is unfolded according to the external signal such as the temperature change or the electrical signal.

When the first unit cell 111 includes the first and second wires S1 and S2 having the loop type knit structure shrink or expand, the first unit cell 111 is morphed in a predetermined first direction. For example, the first direction may be a direction in which an edge of the first unit cell 111 is upward bent. The first unit cell 111 is morphed in the first direction like bending or twisting.

The first area 110 is morphed in a predetermined first pattern where a plurality of the first unit cells 111 is morphed in the first direction. For example, when the first direction is a direction in which the edge of the first unit cell 111 is upward bent, the first pattern may be a U-shaped pattern where an edge is upward bent with respect to a center portion.

As seen in FIGS. 2B and 2D, the second unit cell 121 may include a third wire S3 and a fourth wire S4. In the second unit cell 121, the third wire S3 and the fourth wire S4 may be configured in a knit structure. That is, the third wire S3 and the fourth wire S4 may be divided for representing a portion where smart materials intersect each other in the knit structure. That is, the third wire S3 and the fourth wire S4 may have a structure such as a knitted fabric and may be linked to each other.

The third wire S3 and the fourth wire S4 may have a predetermined arrangement direction. As in FIG. 2B, the arrangement direction of the third wire S3 and the fourth wire S4 may be a horizontal direction which is a direction in which the third wire S3 and the fourth wire S4 extend and are linked to unit cells adjacent thereto. In the following embodiments, if not separately described, description will be made on the assumption that the arrangement direction of the third wire S3 and the fourth wire S4 is the horizontal direction.

The second unit cell 121 may be configured in a loop type knit structure. The third wire S3 and the fourth wire S4 of the second unit cell 121 may intersect each other in a loop type. If the third wire S3 and the fourth wire S4 intersect each other in the loop type, the third wire S3 may be disposed over the fourth wire S4 in a portion which intersection starts and a portion which intersection ends, and the third wire S3 may be disposed under the fourth wire S4 in a loop intermediate portion which intersection continues.

An empty space may be provided inside the loop type knit structure. Therefore, the second unit cell 121 may shrink to an internal empty space according to an external signal such as a temperature change or an electrical signal. Also, each of loops may be unfolded in the arrangement direction of the third wire S3 and the fourth wire S4. Accordingly, the second unit cell 121 may expand as a loop is unfolded according to the external signal such as the temperature change or the electrical signal.

When the second unit cell 121 includes the third and fourth wires S3 and S4 having the loop type knit structure shrink or expand, the second unit cell 121 is morphed in a predetermined second direction. For example, the second direction may be a direction in which an edge of the second unit cell 121 is downward bent. The second unit cell 121 is morphed in the second direction like bending or twisting.

The second area 120 is morphed in a predetermined second pattern where a plurality of the second unit cells 121 is morphed in the second direction. For example, when the second direction is a direction in which the edge of the second unit cell 121 is downward bent, the second pattern may be a ∩-shaped pattern where edges are downward bent with respect to with a center portion.

That is, with respect to a surface parallel to a surface on which the first unit cell 111 and the second unit cell 121 are arranged, the second direction may be a direction opposite to the first direction. Also, with respect to the surface parallel to the surface on which the first unit cell 111 and the second unit cell 121 are arranged, the second pattern may be a pattern opposite to the first pattern.

Figure 3:
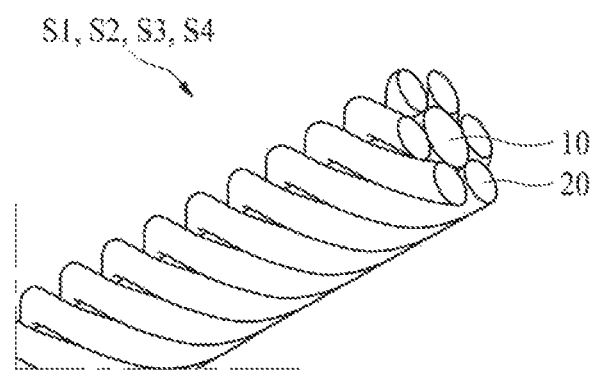
FIG. 3 is a perspective view illustrating in detail a wire according to an embodiment of the present invention.

FIG. 3 is a perspective view illustrating in detail wires S1 to S4 according to an embodiment of the present invention.

As seen in FIG. 3, materials and structures of a first wire S1, a second wire S2, a third wire S3, and a fourth wire S4 may be the same. The first wire S1, the second wire S2, the third wire S3, and the fourth wire S4 may each include a smart material 10 and a covering material 20.

The smart material 10 may be provided in each of the first to fourth wires S1 to S4. For example, as in FIG. 3, the smart material 10 may be provided on a center axis of each of the first to fourth wires S1 to S4. Alternatively, the smart material 10 may not be provided on the center axis of each of the first to fourth wires S1 to S4, and may be provided in another internal area of each the first to fourth wires S1 to S4. The smart material 10 is morphed in a predetermined shape according to an external signal such as a temperature change or an external electrical signal. For example, the smart material 10 is morphed in one direction (for example, a down direction), and for example, is morphed like bending or twisting. The smart material 10 may include a shape memory alloy (SMA), a piezoelectric element, an ionic polymer-metal composite (IPMC), or a conductive polymer (CP), but is not limited thereto. In other embodiments, the smart material 10 may use a material, of which a shape is morphed by an external signal such as a current signal, or a material which is morphed in a predetermined shape according to a temperature change such as heat.

The smart material 10 may additionally include a directional material. The directional material may be inserted into the smart material 10, or may be disposed on a surface of the smart material 10. The directional material may function as an element which prevents deformation in a specific direction. Various deformations may be implemented by appropriately combining the smart material 10, functioning as an active element which induces deformation in a specific direction, and the directional material which prevents deformation in a specific direction. The directional material may be obtained through a fiber weaving process, a rapid prototyping process, or an injection process.

The covering material 20 may be formed to surround an outer portion of the smart material 10 of each of the first to fourth wires S1 to S4. In the first unit cell 111, the covering material 20 prevents the smart material 10 of the first wire S1 from physically contacting or being electrically connected to the smart material 10 of the second wire S2. In the second unit cell 121, the covering material 20 prevents the smart material 10 of the third wire S3 from physically contacting or being electrically connected to the smart material 10 of the fourth wire S4.

The covering material 20 may be formed to surround a side surface of the smart material 10 in a vortex shape as in FIG. 3, but is not limited thereto. That is, the covering material 20 may be formed in a stacked structure where a single insulation film or insulation layer or a plurality of insulation films or insulation layers are stacked on the side surface of the smart material 10.

In various embodiments described below, like reference numerals refer to like elements described above with reference to FIG. 1A to FIG. 3, and a repetitive description on the same element such as a material is omitted.

Embodiment 1

Figure 4A:
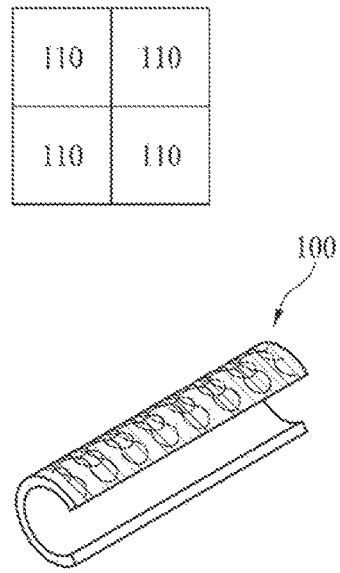
FIGS. 4A and 4B are perspective views illustrating driving of an actuator according to a first embodiment of the present invention.
Figure 4B:
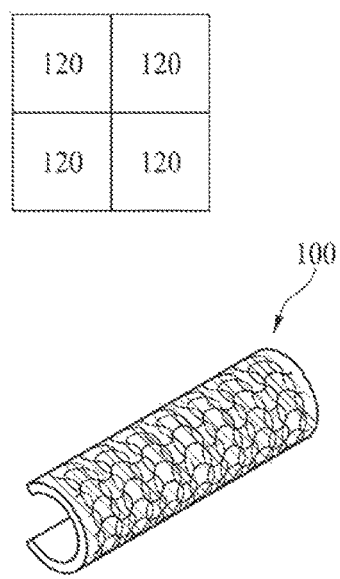

FIGS. 4A and 4B are perspective views illustrating driving of an actuator 100 according to a first embodiment of the present invention.

The actuator 100 according to the first embodiment of the present invention may be an open type actuator 100 which is configured with only a first area 110 or a second area 120. The open type is a type having a structure which freely moves in morphing because movements of wires S1 to S4 arranged in a border or an outer portion are not restrained. For example, the actuator 100 according to the first embodiment of the present invention may be an open type tetragonal actuator 100 illustrated in FIGS. 4A and 4B, but is not limited thereto. In other embodiments, an open type actuator 100 having a figure shape including a polygonal shape, a circular shape, an elliptical shape, or a figure shape including a curve in addition to a tetragonal shape may be the actuator 100 according to the first embodiment of the present invention.

The open type actuator 100 configured with only the first area 110 is morphed in a first pattern according to an external signal such as a temperature change or an electrical signal. Also, the open type actuator 100 configured with only the second area 120 is morphed in a second pattern according to the external signal such as the temperature change or the electrical signal.

For example, in the open type tetragonal actuator 100, the first pattern may be a pattern where bending or rolling occurs in a first direction as in FIG. 4A, and thus, the tetragonal actuator 100 is rolled and is thereby morphed in a cylindrical shape. As another example, in the open type tetragonal actuator 100, the second pattern may be a pattern where bending or rolling occurs in a second direction as in FIG. 4B, and thus, the tetragonal actuator 100 is rolled in a direction opposite to the first pattern and is thereby morphed in a cylindrical shape.

Embodiment 2

Figure 5:
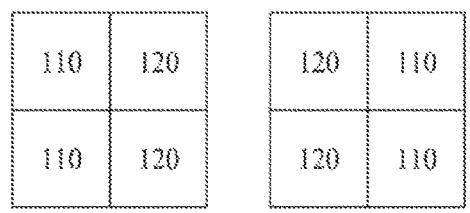
FIGS. 5 to 7 are perspective views illustrating driving of an actuator according to a second embodiment of the present invention.
Figure 5:
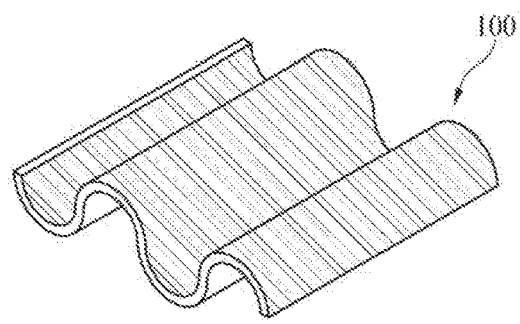
Figure 6:
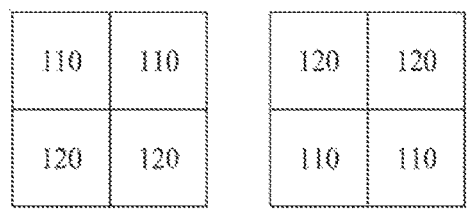
Figure 6:
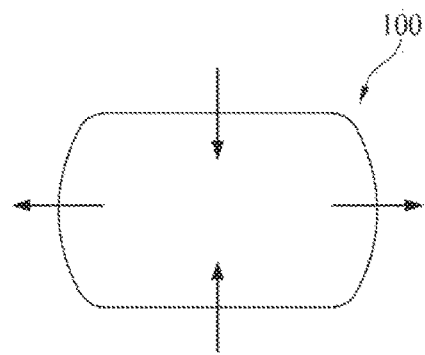
Figure 7:
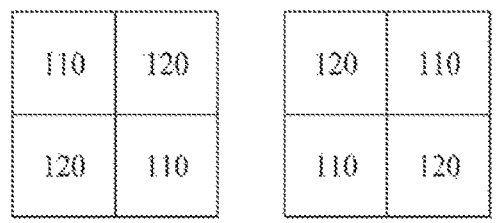
Figure 7:
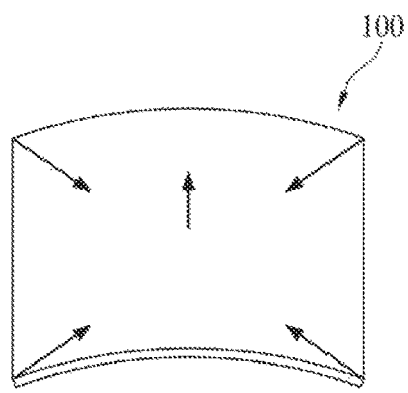

FIGS. 5 to 7 are perspective views illustrating driving of an actuator 100 according to a second embodiment of the present invention. A loop type knit structure of the actuator 100 is not illustrated in FIGS. 5 to 7, but the loop type knit structure of the actuator 100 according to the first embodiment of the present invention may be included in the actuator 100 according to the second embodiment of the present invention.

The actuator 100 according to the second embodiment of the present invention may be an open type actuator 100 which is configured by a combination of one or more first areas 110 and one or more second areas 120. For example, the actuator 100 according to the second embodiment of the present invention may be an open type tetragonal actuator 100 illustrated in FIGS. 5 to 7, but is not limited thereto. In other embodiments, an open type actuator 100 having a figure shape including a polygonal shape, a circular shape, an elliptical shape, or a figure shape including a curve in addition to a tetragonal shape may be the actuator 100 according to the second embodiment of the present invention.

The actuator 100 according to the second embodiment of the present invention is morphed in a third pattern according to an external signal such as a temperature change or an electrical signal. The third pattern may be a pattern which differs from the first pattern, the second pattern, or a combination of the first pattern and the second pattern. That is, a pattern which cannot be predicted from a simple combination of the first area 110 and the second area 120 may be generated. In this case, as in FIG. 5, a portion of the third pattern may include the first pattern or the second pattern, and as in FIGS. 6 and 7, a whole portion of the third pattern may not include the first pattern or the second pattern.

As in FIG. 5, an open type actuator 100 where the first areas 110 and the second areas 120 are alternately arranged in a horizontal direction parallel to an arrangement direction of a first wire S1 and a second wire S2 may be an open type actuator 100 where the first areas 110 are arranged in an arbitrary column, and the second areas 120 are arranged in a column next or previous to the column where the first areas 110 are arranged. Deformation, where repetitive flections are provided in a horizontal direction according to an external signal, occurs in the open type actuator 100 where the first areas 110 and the second areas 120 are alternately arranged in the horizontal direction parallel to the arrangement direction of the first wire S1 and the second wire S2. The deformation corresponds to a form where the first pattern and the second pattern are combined, and is deformation which occurs because deformation of the first area 110 and deformation of the second area 120 occur repeatedly.

As in FIG. 6, an open type actuator 100 where the first areas 110 and the second areas 120 are alternately arranged in a vertical direction vertical to the arrangement direction of the first wire S1 and the second wire S2 may be an open type actuator 100 where the first areas 110 are arranged in an arbitrary row, and the second areas 120 are arranged in a row next or previous to the row where the first areas 110 are arranged. Deformation, where loops overlap each other according to the external signal and thus a vertical-direction length decreases, and the loops are shoved out in a horizontal direction vertical to the vertical direction due to the decrease in the vertical-direction length and thus a horizontal-direction length increases, occurs in the open type actuator 100 where the first areas 110 and the second areas 120 are alternately arranged in the vertical direction vertical to the arrangement direction of the first wire S1 and the second wire S2.

As in FIG. 7, an open type actuator 100 where the first areas 110 and the second areas 120 are alternately arranged in a horizontal direction and a vertical direction with respect to the arrangement direction of the first wire S1 and the second wire S2 may be an open type actuator 100 where the first areas 110 are arranged in a first diagonal direction and the second areas 120 are arranged in a second diagonal direction, or the first areas 110 are arranged in the second diagonal direction and the second areas 120 are arranged in the first diagonal direction. The first diagonal direction may be a direction from a left upper end to a right lower end, and the second diagonal direction may be a direction from a right upper end to a left lower end. Deformation, where an edge shrink to a center portion according to the external signal and thus the center portion expands, occurs in the open type actuator 100 where the first areas 110 and the second areas 120 are alternately arranged in the horizontal direction and the vertical direction with respect to the arrangement direction of the first wire S1 and the second wire S2.

Embodiment 3

FIGS. 8A to 8D are perspective views illustrating driving of an actuator 100 according to a third embodiment of the present invention. A loop type knit structure of the actuator 100 is not illustrated in FIGS. 5 to 7, but the loop type knit structure of the actuator 100 according to the first embodiment of the present invention may be included in the actuator 100 according to the third embodiment of the present invention.

The actuator 100 according to the third embodiment of the present invention may be an open type actuator 100 where a left half is configured with a first area 110 and a right half is configured with a second area 120. In the actuator 100 according to the third embodiment of the present invention, an arrangement direction of first to fourth wires S1 to S4. The actuator 100 according to the third embodiment of the present invention may supply an external signal, such as a temperature change or an electrical signal, to only some areas to morph only the some areas of the actuator 100. Also, the actuator 100 according to the third embodiment of the present invention may set an order in which the external signal is supplied. In FIGS. 8A to 8D, the external signal may be supplied to only a diagonally hatched area. The actuator 100 according to the third embodiment of the present invention may further include an external signal input unit (not shown) that is provided in the actuator 100 and applies the external signal to only some areas of a plurality of the first areas 110 and a plurality of the second areas 120 so that the external signal is applied to only the some areas of the first areas 110 and the second areas 120.

Figure 8A:
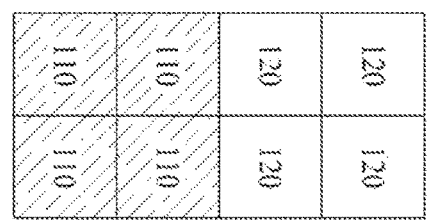
FIGS. 8A to 8D are perspective views illustrating driving of an actuator according to a third embodiment of the present invention.
Figure 8A:
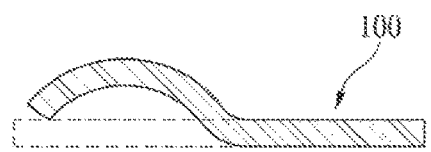

As in FIG. 8A, when the external signal is supplied to a left half of the actuator 100 according to the third embodiment of the present invention, the left half of the actuator 100 is morphed identically to a shape where the open type actuator 100 configured with a single first area 110 is morphed, and a right half of the actuator 100 may maintain the same shape as a shape before the external signal is supplied.

Figure 8B:
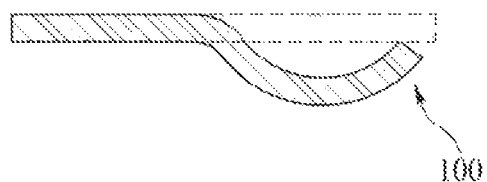

As in FIG. 8B, when the external signal is supplied to the right half of the actuator 100 according to the third embodiment of the present invention, the right half of the actuator 100 is morphed identically to a shape where the open type actuator 100 configured with a single second area 120 is morphed, and the left half of the actuator 100 may maintain the same shape as a shape before the external signal is supplied.

Figure 8C:

As in FIG. 8C, when the external signal is supplied to a center area of the actuator 100 according to the third embodiment of the present invention, first supplied to the first area 100, and subsequently supplied to the second area 120, a left half of the center area of the actuator 100 is morphed identically to a shape where the open type actuator 100 configured with a single first area 110 is morphed. Also, a right half of the center area of the actuator 100 is morphed identically to a shape where the open type actuator 100 configured with a single second area 120 is morphed, and both edge areas of the actuator 100 other than the center area may maintain the same shape as a shape before the external signal is supplied.

Figure 8D:
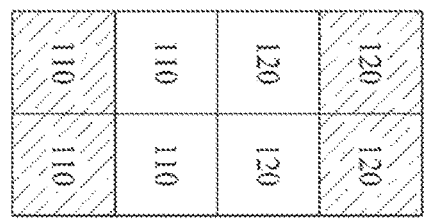
Figure 8D:
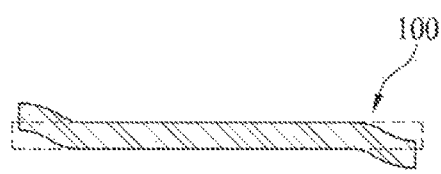

As in FIG. 8D, when the external signal is supplied to the both edge areas of the actuator 100 according to the third embodiment of the present invention, a left edge area of the actuator 100 is morphed identically to a shape where the open type actuator 100 configured with the single first area 110 is morphed. Also, a right edge area of the actuator 100 is morphed identically to a shape where the open type actuator 100 configured with the single second area 120 is morphed, and the center area other than the both edge areas of the actuator 100 may maintain the same shape as a shape before the external signal is supplied.

Embodiment 4

Figure 9A:
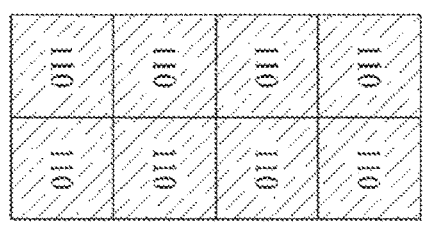
FIGS. 9A to 9C are perspective views illustrating driving of an actuator according to a fourth embodiment of the present invention.
Figure 9A:
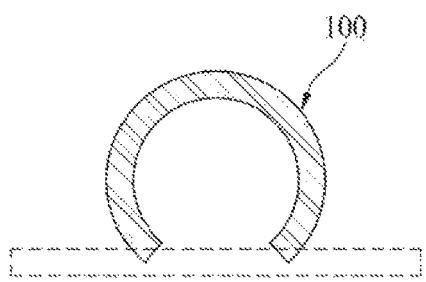
Figure 9B:
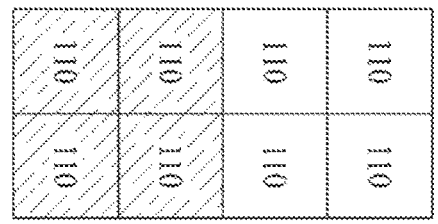
Figure 9B:
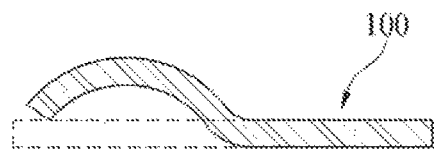
Figure 9C:
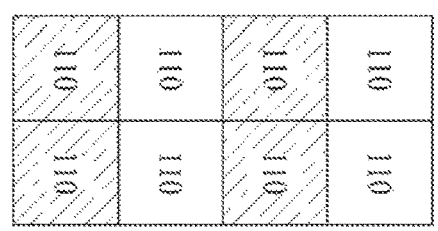
Figure 9C:
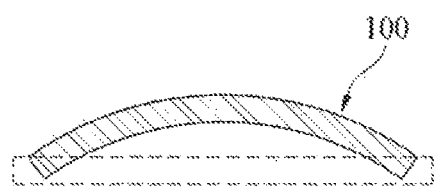

FIGS. 9A to 9C are perspective views illustrating driving of an actuator according to a fourth embodiment of the present invention. A loop type knit structure of the actuator 100 is not illustrated in FIGS. 9A to 9C, but the loop type knit structure of the actuator 100 according to the first embodiment of the present invention may be included in the actuator 100 according to the fourth embodiment of the present invention.

The actuator 100 according to the fourth embodiment of the present invention may be an open type actuator 100 configured with a single first area 110. In the actuator 100 according to the fourth embodiment of the present invention, an arrangement direction of a first wire S1 and a second wire S2 may be a vertical direction. In the actuator 100 according to the fourth embodiment of the present invention, by supplying an external signal such as a temperature change or an electrical signal to a whole area or only a partial area of the actuator 100, only the partial area of the actuator 100 is morphed, or a morphing degree of the actuator 100 may be adjusted. The morphing degree may be a numerical value obtained by calculating a changed length or width between before and after the external signal is supplied to the actuator 100. In FIGS. 9A to 9C, the external signal may be supplied to only a diagonally hatched area. The actuator 100 according to the fourth embodiment of the present invention may further include an external signal input unit (not shown) that is provided in the actuator 100 and applies the external signal to only some areas of a plurality of the first areas 110 and a plurality of the second areas 120 so that the external signal is applied to only the some areas of the first areas 110 and the second areas 120.

As in FIG. 9A, when the external signal is supplied to a whole area of the actuator 100 according to the fourth embodiment of the present invention, the whole area of the actuator 100 is morphed identically to a shape where an open type actuator 100 configured with a single first area 110 is morphed, and a morphing degree may be a maximum value.

As in FIG. 9B, when the external signal is supplied to a left half of the actuator 100 according to the fourth embodiment of the present invention, the left half of the actuator 100 is morphed identically to a shape where the open type actuator 100 configured with the single first area 110 is morphed, and a right half of the actuator 100 may maintain the same shape as a shape before the external signal is supplied.

As in FIG. 9C, when the external signal is supplied to a left one-fourth area and a right one-fourth area of the actuator 100 according to the fourth embodiment of the present invention, the whole area of the actuator 100 is morphed identically to a shape where the open type actuator 100 configured with the single first area 110 is morphed, and a morphing degree may be less than the maximum value.

Embodiment 5

Figure 10:
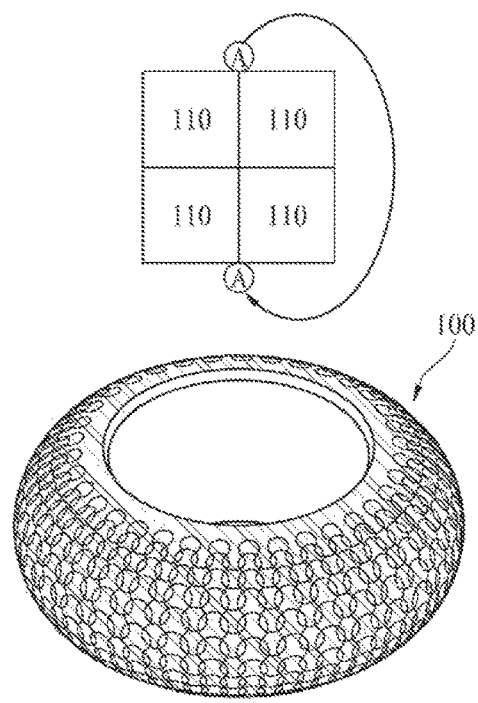
FIGS. 10 and 11 are perspective views illustrating driving of an actuator according to a fifth embodiment of the present invention.
Figure 11:
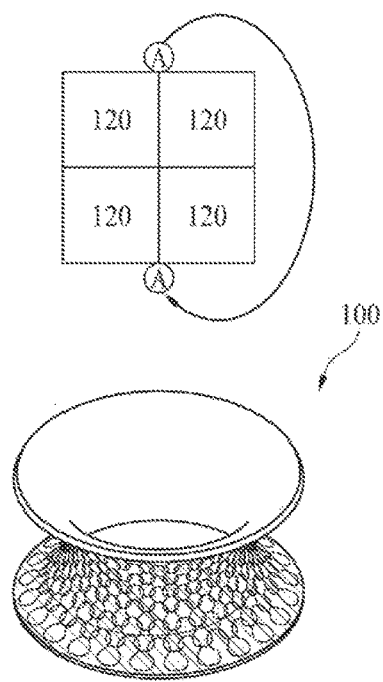

FIGS. 10 and 11 are perspective views illustrating driving of an actuator 100 according to a fifth embodiment of the present invention.

The actuator 100 according to the fifth embodiment of the present invention may be a closed type actuator 100 which is configured with only a first area 110 or a second area 120. The closed type is a type having a structure which cannot freely move in morphing because wires S1 to S4 arranged in a border or an outer portion are fixed or movements of the wires S1 to S4 are restrained. The actuator 100 according to the fifth embodiment of the present invention may be a closed type cylindrical actuator 100 where an upper side and a lower side of a tetragon are adhered to each other. That is, as in FIGS. 10 and 11, the actuator 100 may be implemented by connecting one point A and another point A.

The closed type actuator 100 configured with only the first area 110 is morphed in a first pattern according to an external signal such as a temperature change or an electrical signal. Also, the closed type actuator 100 configured with only the second area 120 is morphed in a second pattern according to the external signal such as the temperature change or the electrical signal.

For example, in the closed type actuator 100, the first pattern may be a morphing pattern where bending or rolling occurs in a first direction as in FIG. 10, and thus, a center portion of a side surface of a cylinder of the actuator 100 expands. Also, in the closed type actuator 100, the second pattern may be a morphing pattern where bending or rolling occurs in a second direction as in FIG. 11, and thus, the center portion of the side surface of the cylinder of the actuator 100 shrinks.

Embodiment 6

Figure 12:
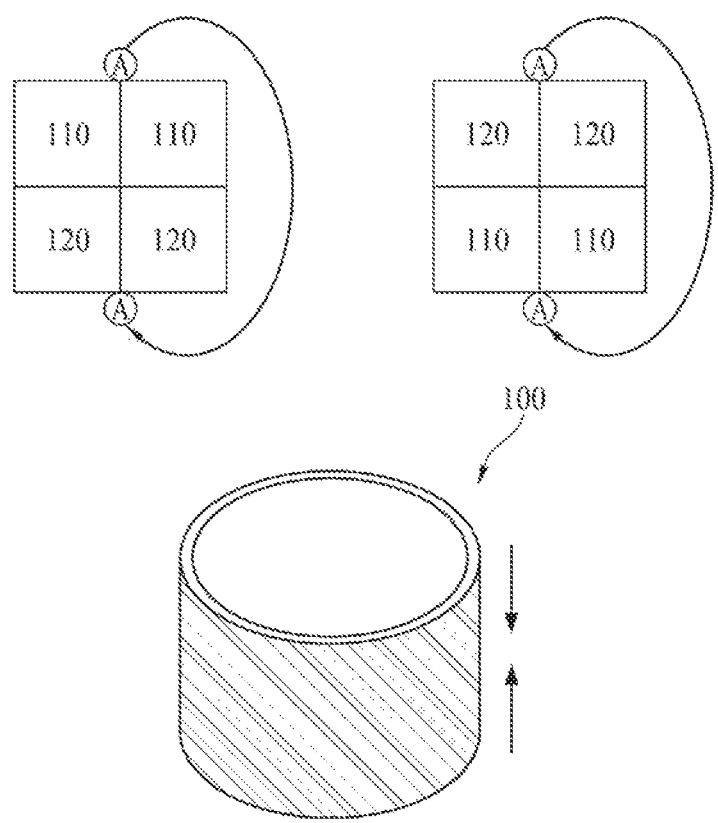
FIGS. 12 to 14 are perspective views illustrating driving of an actuator according to a sixth embodiment of the present invention.
Figure 13:
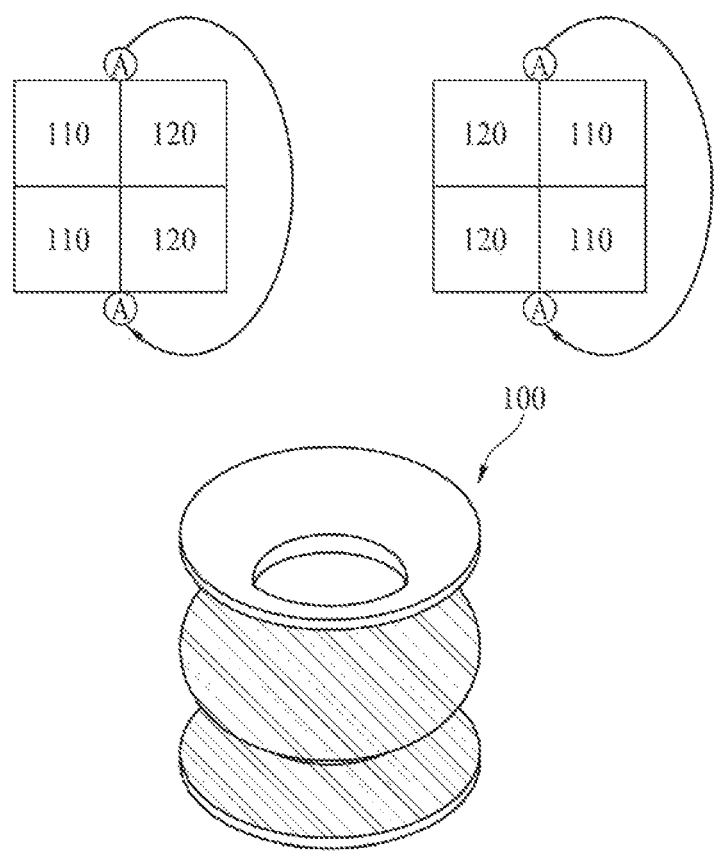
Figure 14:
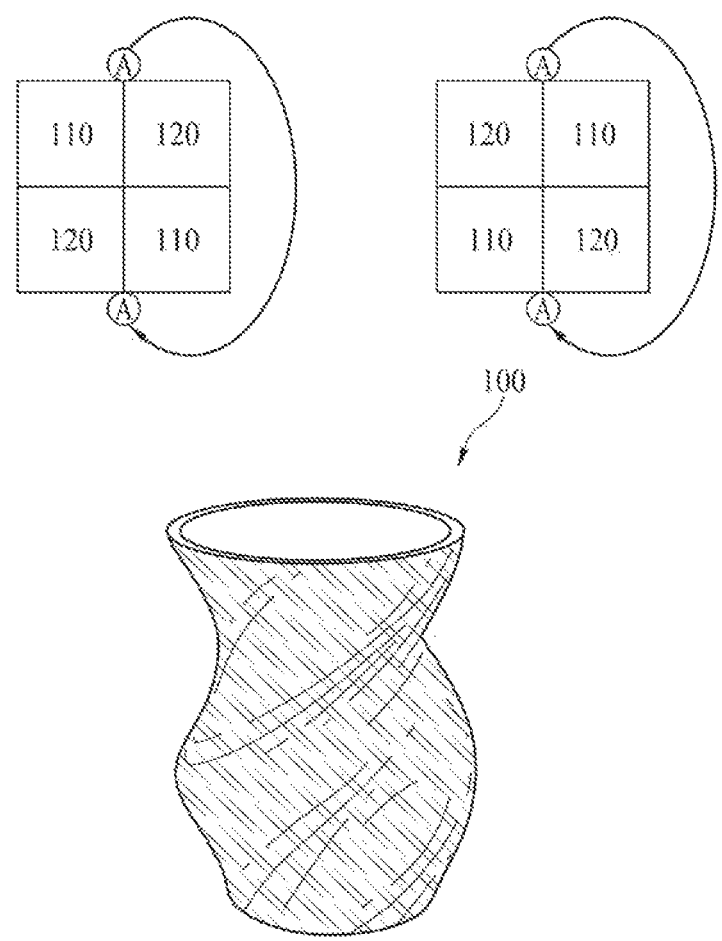

FIGS. 12 to 14 are perspective views illustrating driving of an actuator according to a sixth embodiment of the present invention. A loop type knit structure of the actuator 100 is not illustrated in FIGS. 12 to 14, but the loop type knit structure of the actuator 100 according to the fifth embodiment of the present invention may be included in the actuator 100 according to the sixth embodiment of the present invention.

The actuator 100 according to the sixth embodiment of the present invention may be a closed type actuator 100 which is configured by a combination of one or more first areas 110 and one or more second areas 120. The actuator 100 according to the sixth embodiment of the present invention may be a closed type cylindrical actuator 100 where an upper side and a lower side of a tetragon are adhered to each other. That is, as in FIGS. 12 to 14, the actuator 100 may be implemented by connecting one point A and another point A.

The actuator 100 according to the sixth embodiment of the present invention is morphed in a fourth pattern according to an external signal such as a temperature change or an electrical signal. The fourth pattern may be a pattern which differs from the first pattern, the second pattern, or a combination of the first pattern and the second pattern. That is, a new pattern which cannot be predicted from a simple combination of the first area 110 and the second area 120 may be generated. In this case, as in FIGS. 12 to 14, a whole portion of the fourth pattern may not include the first pattern or the second pattern.

As in FIG. 12, the actuator 100 according to the sixth embodiment of the present invention may be a closed type actuator 100 where the first areas 110 and the second areas 120 are alternately arranged in a direction vertical to an arrangement direction of a first wire S1 and a second wire S2 and an upper side and a lower side are adhered to each other. Deformation, where a size of a loop having a knit structure of each of the first and second wires S1 and S2 is reduced according to the external signal and thus a height of a cylinder is reduced, occurs in the closed type actuator 100 where the first areas 110 and the second areas 120 are alternately arranged in the direction vertical to the arrangement direction of the first wire S1 and the second wire S2.

As in FIG. 13, the actuator 100 according to the sixth embodiment of the present invention may be a closed type actuator 100 where the first areas 110 and the second areas 120 are alternately arranged in a horizontal direction parallel to the arrangement direction of the first wire S1 and the second wire S2 and the upper side and the lower side are adhered to each other. In the closed type actuator 100 where the first areas 110 and the second areas 120 are alternately arranged in the horizontal direction parallel to the arrangement direction of the first wire S1 and the second wire S2, repetitive flections are provided in a vertical direction vertical to the horizontal direction according to the external signal.

As in FIG. 14, the actuator 100 according to the sixth embodiment of the present invention may be a closed type actuator 100 where the first areas 110 and the second areas 120 are alternately arranged in a horizontal direction and a vertical direction with respect to the arrangement direction of the first wire S1 and the second wire S2 and the upper side and the lower side are adhered to each other. A side surface of a cylinder is bent or rolled in a first diagonal direction or a second diagonal direction, and thus, the closed type actuator 100, where the first areas 110 and the second areas 120 are alternately arranged in the horizontal direction and the vertical direction with respect to the arrangement direction of the first wire S1 and the second wire S2, is morphed in a spiral shape where a side surface is curved.

Embodiment 7

Figure 15:
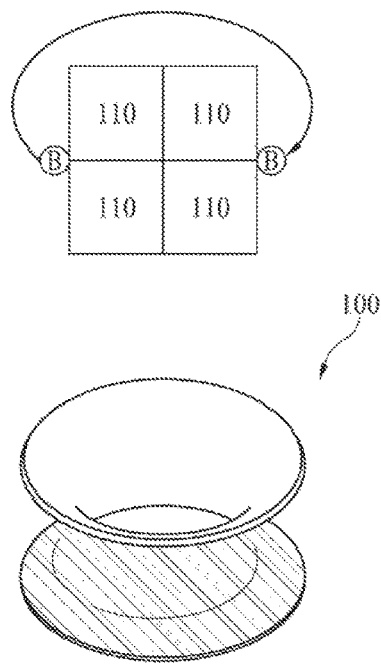
FIGS. 15 and 16 are perspective views illustrating driving of an actuator according to a seventh embodiment of the present invention.
Figure 16:
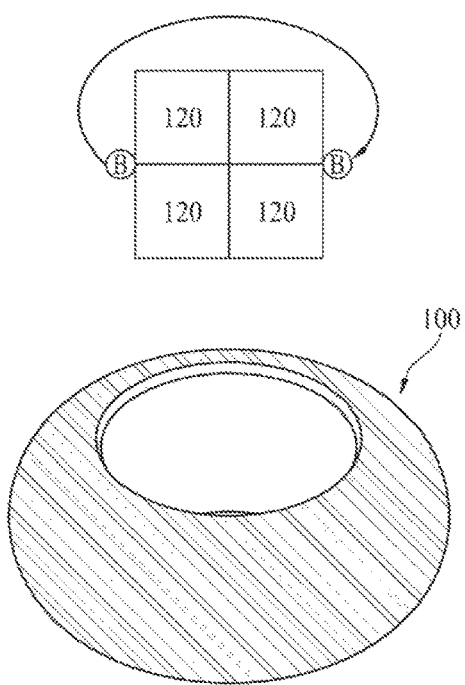

FIGS. 15 and 16 are perspective views illustrating driving of an actuator 100 according to a seventh embodiment of the present invention. A loop type knit structure of the actuator 100 is not illustrated in FIGS. 15 and 16, but the loop type knit structure of the actuator 100 according to the fifth embodiment of the present invention may be included in the actuator 100 according to the seventh embodiment of the present invention.

The actuator 100 according to the seventh embodiment of the present invention may be a closed type actuator 100 which is configured with only a first area 110 or a second area 120. The actuator 100 according to the seventh embodiment of the present invention may be a closed type cylindrical actuator 100 where a left side and a right side of a tetragon are adhered to each other. That is, as in FIGS. 15 and 16, the actuator 100 may be implemented by connecting one point B and another point B.

The closed type actuator 100 configured with only the first area 110 is morphed in a second pattern according to an external signal such as a temperature change or an electrical signal. Also, the closed type actuator 100 configured with only the second area 120 is morphed in a first pattern according to the external signal such as the temperature change or the electrical signal.

Since the actuator 100 according to the seventh embodiment of the present invention is manufactured by connecting the points B without connecting the points A in manufacturing a closed type, positions of the first pattern and the second pattern may be switched therebetween in comparison with the actuator 100 according to the fifth embodiment of the present invention.

Embodiment 8

Figure 17:
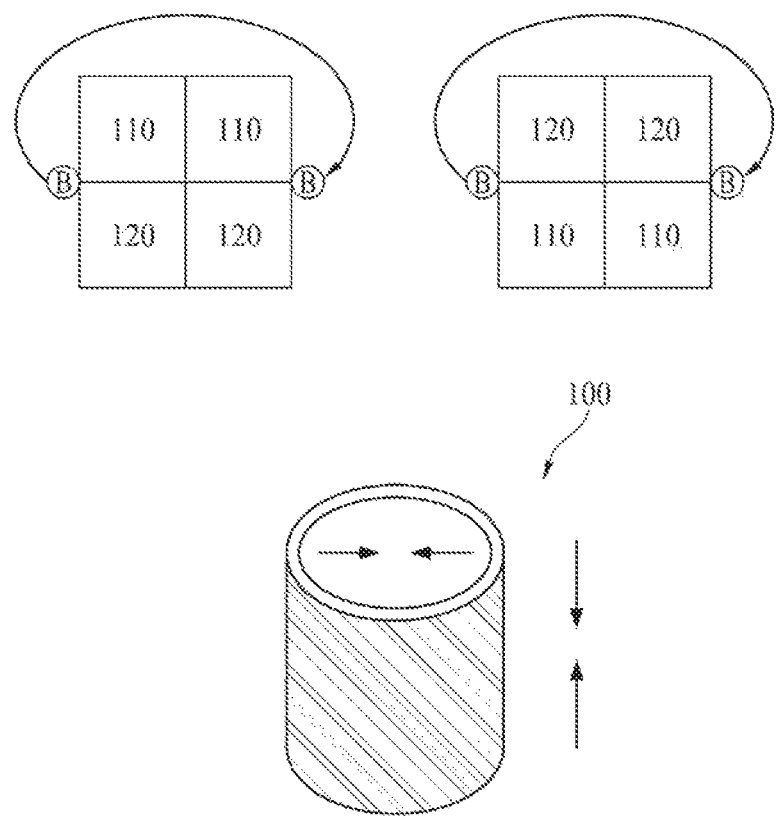
FIGS. 17 to 19 are perspective views illustrating driving of an actuator according to an eighth embodiment of the present invention.
Figure 18:
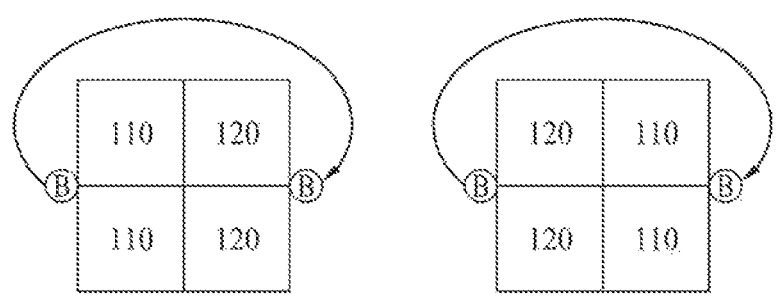
Figure 18:
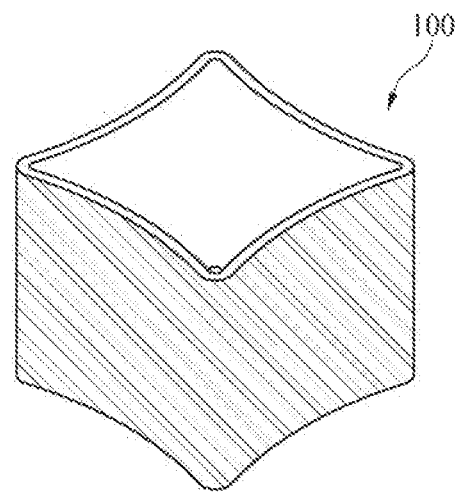
Figure 19:
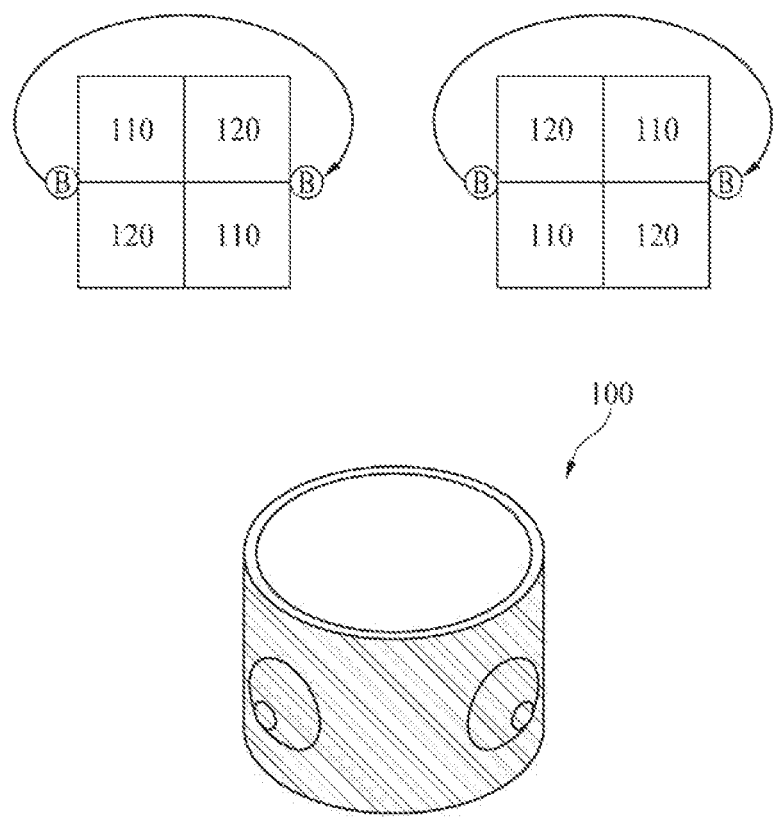

FIGS. 17 to 19 are perspective views illustrating driving of an actuator 100 according to an eighth embodiment of the present invention. A loop type knit structure of the actuator 100 is not illustrated in FIGS. 17 to 19, but the loop type knit structure of the actuator 100 according to the fifth embodiment of the present invention may be included in the actuator 100 according to the eighth embodiment of the present invention.

The actuator 100 according to the eighth embodiment of the present invention may be a closed type actuator 100 which is configured by a combination of one or more first areas 110 and one or more second areas 120. The actuator 100 according to the eighth embodiment of the present invention may be a closed type cylindrical actuator 100 where a left side and a right side of a tetragon are adhered to each other. That is, as in FIGS. 17 to 19, the actuator 100 may be implemented by connecting one point B and another point B.

The actuator 100 according to the eighth embodiment of the present invention is morphed in a fifth pattern according to an external signal such as a temperature change or an electrical signal. The fifth pattern may be a pattern which differs from the first pattern, the second pattern, or a combination of the first pattern and the second pattern. That is, a new pattern which cannot be predicted from a simple combination of the first area 110 and the second area 120 may be generated. In this case, as in FIGS. 17 to 19, a whole portion of the fifth pattern may not include the first pattern or the second pattern.

As in FIG. 17, the actuator 100 according to the eighth embodiment of the present invention may be a closed type actuator 100 where the first areas 110 and the second areas 120 are alternately arranged in a direction vertical to an arrangement direction of a first wire S1 and a second wire S2 and a left side and a right side are adhered to each other. Deformation, where a size of a loop having a knit structure of each of the first and second wires S1 and S2 is reduced according to the external signal and thus a diameter and a height of a cylinder are reduced, occurs in the closed type actuator 100 where the first areas 110 and the second areas 120 are alternately arranged in the direction vertical to the arrangement direction of the first wire S1 and the second wire S2.

As in FIG. 18, the actuator 100 according to the eighth embodiment of the present invention may be a closed type actuator 100 where the first areas 110 and the second areas 120 are alternately arranged in a horizontal direction parallel to the arrangement direction of the first wire S1 and the second wire S2 and the left side and the right side are adhered to each other. As a side surface shrinks with respect to a center axis according to the external signal, the closed type actuator 100 where the first areas 110 and the second areas 120 are alternately arranged in a horizontal direction parallel to the arrangement direction of the first wire S1 and the second wire S2 is morphed to have a figure including a curve where a top and a bottom are recessed with respect to the center axis.

As in FIG. 19, the actuator 100 according to the eighth embodiment of the present invention may be a closed type actuator 100 where the first areas 110 and the second areas 120 are alternately arranged in a horizontal direction and a vertical direction with respect to the arrangement direction of the first wire S1 and the second wire S2 and the left side and the right side are adhered to each other. Deformation, where a side surface irregularly expands according to the external signal and thus irregular flections are provided on the side surface, occurs in the closed type actuator 100 where the first areas 110 and the second areas 120 are alternately arranged in the horizontal direction and the vertical direction with respect to the arrangement direction of the first wire S1 and the second wire S2.

Embodiment 9

FIGS. 20A to 20D are perspective views illustrating driving of an actuator according to a ninth embodiment of the present invention. A loop type knit structure of the actuator 100 is not illustrated in FIGS. 20A to 20D, but the loop type knit structure of the actuator 100 according to the fifth embodiment of the present invention may be included in the actuator 100 according to the ninth embodiment of the present invention.

The actuator 100 according to the ninth embodiment of the present invention may be a closed type actuator 100 which is manufactured by attaching a left side and a right side of an open type actuator 100 where a first area 110 is disposed in an upper half and a second area 120 is disposed in a lower half That is, as in FIGS. 20A to 20D, the actuator 100 may be implemented by connecting one point B and another point B. In the actuator 100 according to the ninth embodiment of the present invention, by supplying an external signal such as a temperature change or an electrical signal to a whole area or a partial area of the actuator 100, the whole area of the actuator 100 is morphed, or the partial area of the actuator 100 is morphed. In FIGS. 20A to 20D, the external signal may be supplied to only a diagonally hatched area. The actuator 100 according to the ninth embodiment of the present invention may further include an external signal input unit (not shown) that is provided in the actuator 100 and applies the external signal to only some areas of a plurality of the first areas 110 and a plurality of the second areas 120 so that the external signal is applied to only the some areas of the first areas 110 and the second areas 120.

Figure 20A:
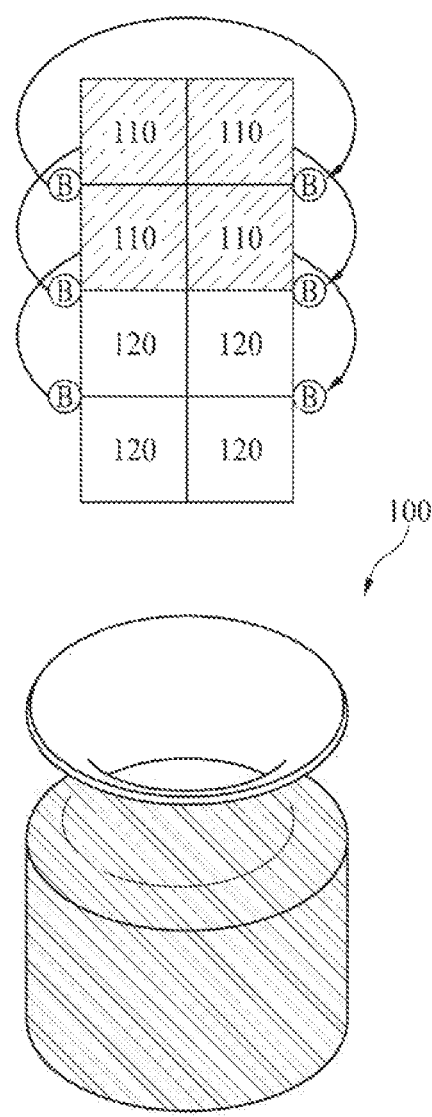
FIGS. 20A to 20D are perspective views illustrating driving of an actuator according to a ninth embodiment of the present invention.

As in FIG. 20A, when the external signal is supplied to an upper half of the actuator 100 according to the ninth embodiment of the present invention, deformation where the upper half of the actuator 100 is inward bent or rolled and thus a center portion of a cylinder shrinks occurs in the actuator 100, and a lower half of the actuator 100 is not morphed in shape.

Figure 20B:
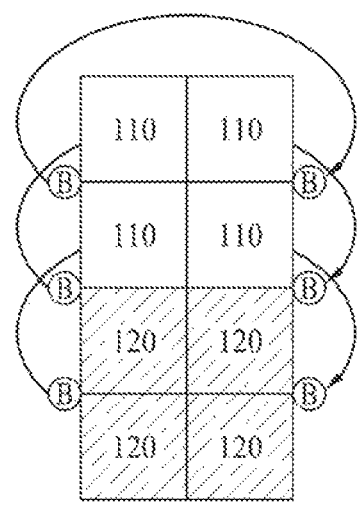
Figure 20B:
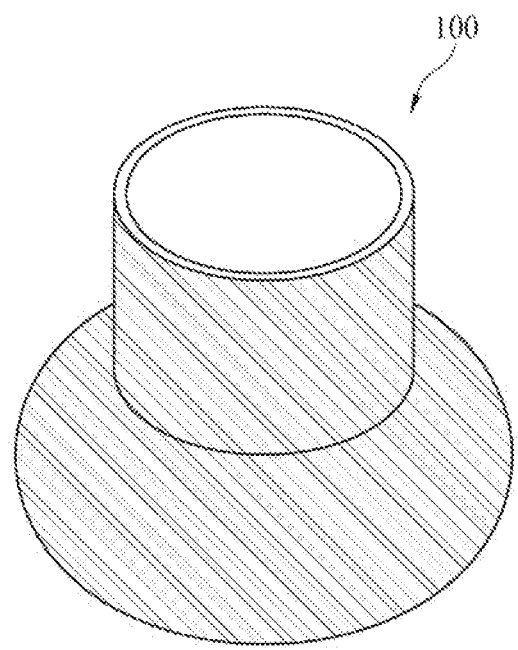

As in FIG. 20B, when the external signal is supplied to the lower half of the actuator 100 according to the ninth embodiment of the present invention, deformation where the lower half of the actuator 100 is outward bent or rolled and thus the center portion of the cylinder expands occurs in the actuator 100, and the upper half of the actuator 100 is not morphed in shape.

Figure 20C:
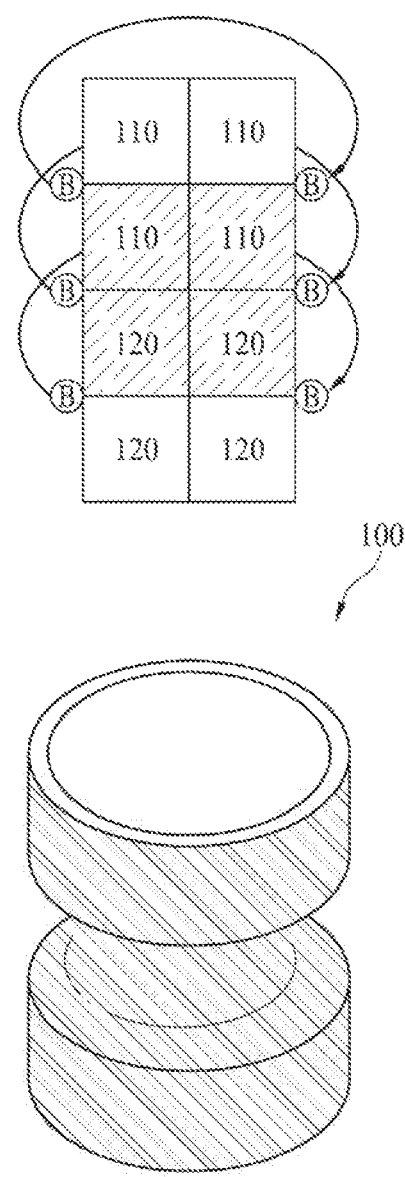

As in FIG. 20C, when the external signal is supplied to a center area of the actuator 100 according to the ninth embodiment of the present invention, an upper half of the center area of the actuator 100 is inward bent or rolled, the lower half of the actuator 100 is outward bent or rolled, and the other area of the actuator 100 except the center area maintains a current shape.

Figure 20D:
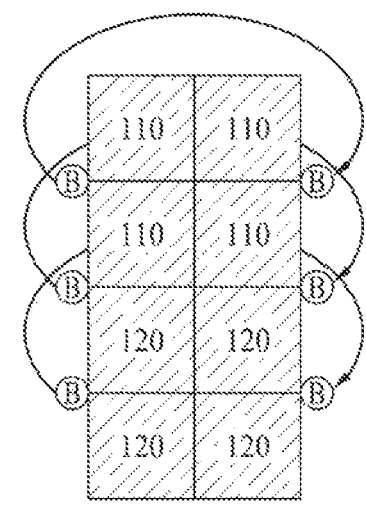
Figure 20D:
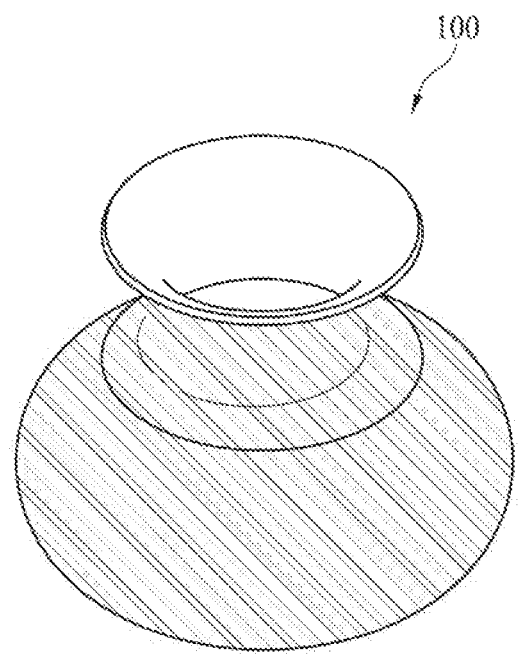

As in FIG. 20D, when the external signal is supplied to the whole area of the actuator 100 according to the ninth embodiment of the present invention, deformation where the upper half of the actuator 100 is inward bent or rolled and thus the center portion of the cylinder shrinks occurs in the actuator 100, and deformation where the lower half of the actuator 100 is outward bent or rolled and thus the center portion of the cylinder expands occurs in the actuator 100.

Embodiment 10

Figure 21:
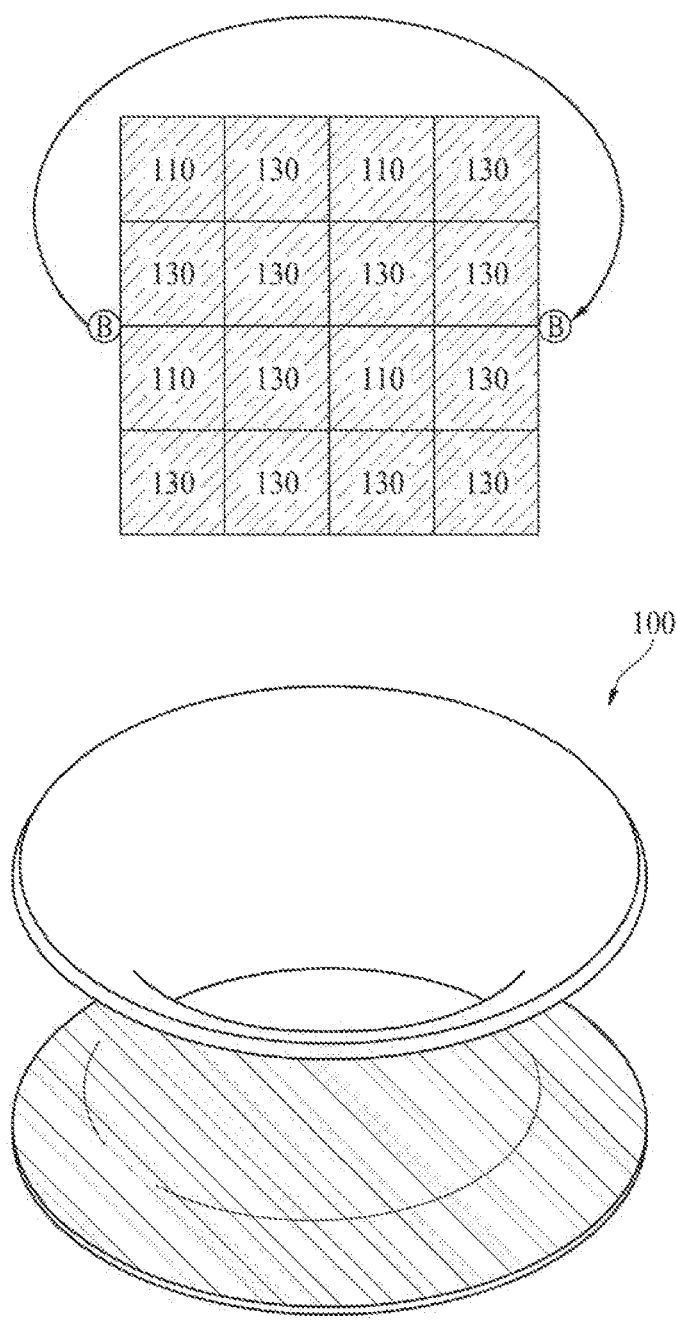
FIG. 21 is a perspective view illustrating driving of an actuator according to a tenth embodiment of the present invention.

FIG. 21 is a perspective view illustrating driving of an actuator 100 according to a tenth embodiment of the present invention.

The actuator 100 according to the tenth embodiment of the present invention may be a closed type actuator 100 which is manufactured by attaching a left side and a right side of an open type actuator 100 where a first area 110 and a third area 130 are uniformly distributed. That is, as in FIG. 21, the actuator 100 may be implemented by connecting one point B and another point B.

The third area 130 may have a structure which includes a single smart material 10 for connecting the first area 110. Alternatively, the third area 130 may have a structure that acts as a support such as a rod, a bar, metal, or fluid for connecting the first area 110. Alternatively, the third area 130 may have a circle, rectilinear, or mesh type knit structure which differs from a loop type knit structure of each of the first area 110 and a second area 120. Alternatively, the third area 130 may have a fabric structure using a plurality of yarns, instead of a knit structure. The plurality of yarns may be the smart material 10 or smart materials S1 to S4, or may each be a yarn or a fabric which is implemented by long extending another material.

An example where a plurality of the first areas 110 and a plurality of the third areas 130 are uniformly distributed at a ratio of 1:3 is illustrated in FIG. 21, but the first areas 110 and the third areas 130 may be distributed at a certain ratio without being limited thereto. As a ratio of the first areas 110 becomes higher, a morphing degree of the actuator 100 may be high, and as a ratio of the third areas 130 becomes higher, a morphing degree of the actuator 100 may be low. Alternatively, as a ratio of the first areas 110 becomes higher, a morphing pattern of the actuator 100 is similar to the above-described first to ninth embodiments, and as a ratio of the third areas 130 becomes higher, the morphing pattern of the actuator 100 differs from the above-described first to ninth embodiments.

As in FIG. 21, when an external signal is supplied to a closed type actuator 100 which includes the first area 110 and the third area 130, deformation which is the same as deformation which occurs in a closed type actuator 100 implemented by connecting B points constituting a single first area 110 occurs. Therefore, the actuator 100 may not be configured with only the first area 110 or the second area 120. In comparison with the first area 110 or the second area 120, the third area 130 is easily configured, is reduced in manufacturing cost, or uses a material where a shape is easily maintained, and thus, if the actuator 100 includes the third area 130, the actuator 100 is more easily designed and configured.

Embodiment 11

Figure 22:
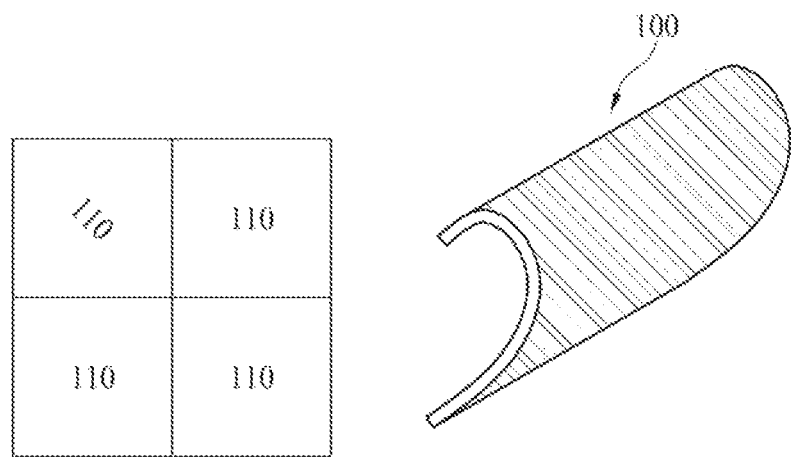
FIG. 22 is a perspective view illustrating driving of an actuator according to an eleventh embodiment of the present invention.

FIG. 22 is a perspective view illustrating driving of an actuator 100 according to an eleventh embodiment of the present invention.

As in FIG. 22, the actuator 100 according to the eleventh embodiment of the present invention may be an open type actuator 100 or a closed type actuator 100. Also, as in FIG. 22, the actuator 100 according to the eleventh embodiment of the present invention may be configured with only a plurality of first areas 110, or may be configured with a plurality of first areas 110 and a plurality of second areas 120. In the actuator 100 according to the eleventh embodiment of the present invention, a loop type knit structure may be arranged in a first diagonal direction or a second diagonal direction in some areas of the first areas 110 or the second areas 120. That is, a smart material 10 of the actuator 100 according to the eleventh embodiment of the present invention may be arranged in the first diagonal direction or the second diagonal direction in the some areas of the first areas 110 or the second areas 120.

As in FIG. 22, when the external signal is supplied to the actuator 100 according to the eleventh embodiment of the present invention, the actuator 100 is twisted in the first diagonal direction or the second diagonal direction and thus bent or rolled, and for this reason, the actuator 100 is morphed in a twisted cylindrical shape.

Embodiment 12

FIGS. 23 to 27 are perspective views illustrating driving of an actuator 100 according to a twelfth embodiment of the present invention.

The actuator 100 according to the twelfth embodiment of the present invention may have a structure where at least ones of a plurality of first areas 110 or a plurality of second areas 120 are stacked as a plurality of layers. Therefore, the actuator 100 may have a structure where one or more first areas 110 or second areas 120 are stacked on a lowermost-layer first area 110 or a lowermost-layer second area 120.

Figure 23:
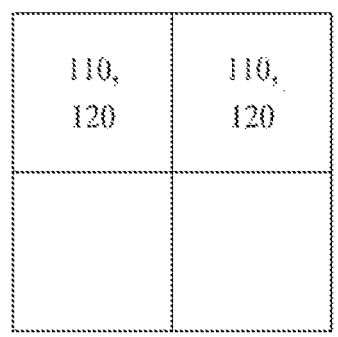
FIGS. 23 to 27 are perspective views illustrating driving of an actuator according to a twelfth embodiment of the present invention.

In the actuator 100 according to the twelfth embodiment of the present invention, as in FIG. 23, the first area 110 or the second area 120 may be stacked on the first area 110, and the first area 110 or the second area 120 may be stacked on the second area 120. A knit structure of the stacked first area 110 or second area 120 is the same as that of the lowermost-layer first area 110 or second area 120, and a boundary portion between the stacked first areas 110 or second areas 120 is the same as a boundary portion between lowermost-layer first areas 110 or second areas 120. Also, the lowermost-layer first areas 110 or second areas 120 and the stacked first areas 110 or second areas 120 may be configured in knit structures including different smart materials 10, or may be configured in a knit structure including a single smart material 10.

Figure 24:
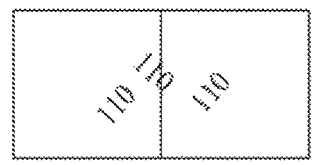

Alternatively, in the actuator 100 according to the twelfth embodiment of the present invention, as in FIG. 24, one first area 110 may be stacked on another first area 110, and in this manner, one second area 120 may be stacked on another second area 120. If an internal knit structure of a lowermost-layer first area 110 is disposed in a horizontal direction or a vertical direction, an internal structure of the stacked first area 110 may be disposed in a first diagonal direction or a second diagonal direction. Also, the first area 110 stacked over the boundary portion between the lowermost-layer first areas 110 may be stacked. Also, the lowermost-layer first areas 110 or second areas 120 and the stacked first areas 110 or second areas 120 may be configured in the knit structures including the different smart materials 10, or may be configured in the knit structure including the single smart material 10.

Figure 25:
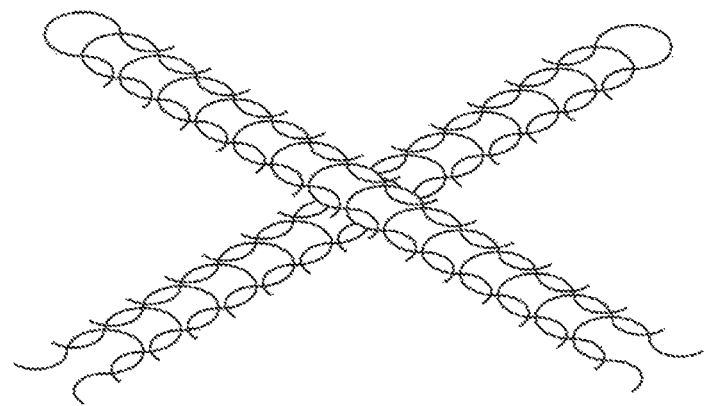
Figure 26:
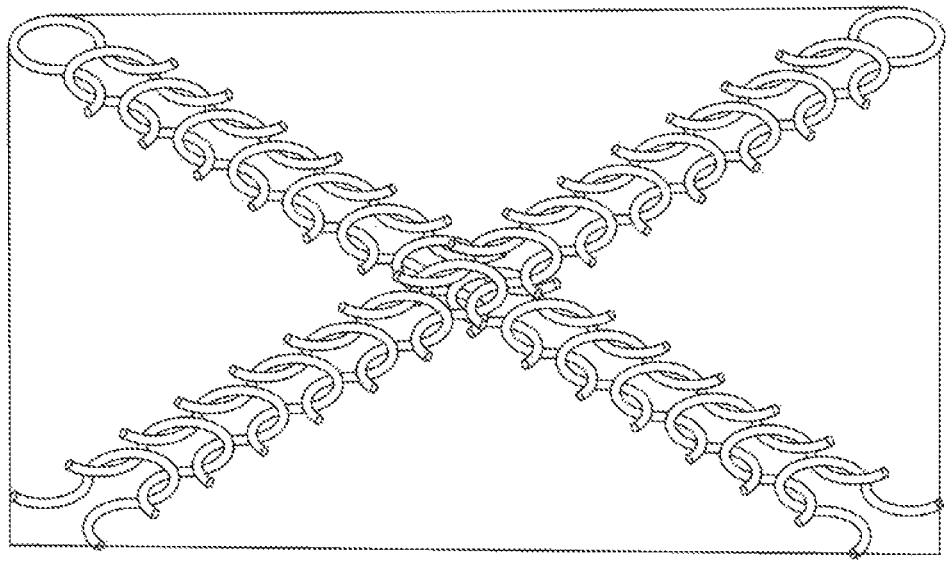
Figure 27:
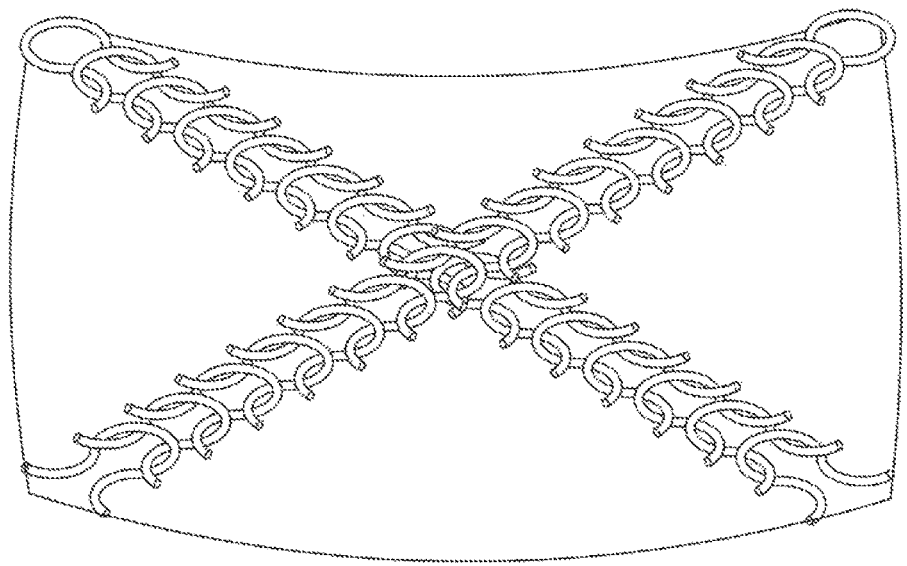

For example, in FIGS. 25 to 27, the actuator 100 according to the twelfth embodiment of the present invention may be an actuator 100 where loop type knit structures intersect diagonally. As in FIG. 25, the actuator 100 according to the twelfth embodiment of the present invention may be an actuator 100 where unit cells are diagonally linked to each other, and loop type knit structures intersect each other in an X-shape in a center portion. A loop structure crossing a first diagonal line and a loop structure crossing a second diagonal line may be disposed on different layers. As in FIG. 26, the actuator 100 according to the twelfth embodiment may be linked to four corners a lowermost layer having a tetragonal shape. In this case, the actuator 100 may realize an operation where a loop structure shrinks according to an external signal, and the four corners of the lowermost layer are folded.

Embodiment 13

Figure 28:
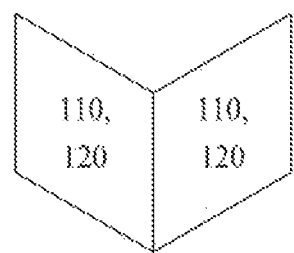
FIGS. 28 and 29 are perspective views illustrating driving of an actuator according to a thirteenth embodiment of the present invention.
Figure 29:
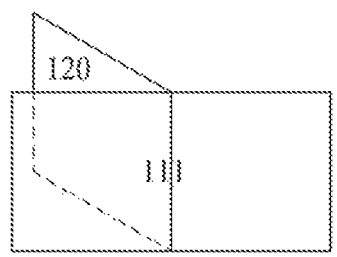

FIGS. 28 and 29 are perspective views illustrating driving of an actuator 100 according to a thirteenth embodiment of the present invention.

In the actuator 100 according to the thirteenth embodiment of the present invention, a first area 100 or a second area 120 may extend to a three-dimensional (3D) space.

In the actuator 100 according to the thirteenth embodiment of the present invention, as in FIG. 28, first areas 120 or second areas 120 disposed adjacent to a border of one first area 110 or second area 120 may not be disposed in parallel on a plane but may be disposed to have a slope in the 3D space. Therefore, the first areas 110 or the second areas 120 may extend to the 3D space, and thus, various driving forms may be implemented by combining the first areas 110, which has been morphed in a first pattern, and the second areas which has been morphed in a second pattern.

Alternatively, in the actuator 100 according to the thirteenth embodiment of the present invention, as in FIG. 29, a smart material 10 disposed inside a first unit cell 111 or a second unit cell 121 may branch to the 3D space. Therefore, the branched smart material 10 may configure the first area 110 or the second area 120 in the 3D space. Various driving forms may be implemented by combining the first area 110 and the second area 120 which have branched from the first unit cell 111 or the second unit cell 121 to the 3D space and have been respectively morphed in the first pattern and the second pattern.

Embodiment 14

Figure 30:
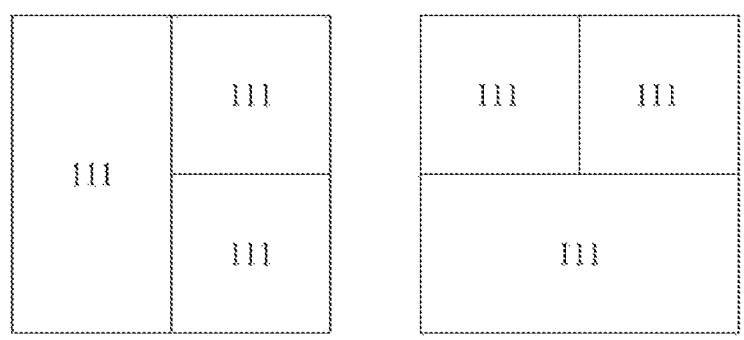
FIG. 30 is a perspective view illustrating driving of an actuator according to a fourteenth embodiment of the present invention.

FIG. 30 is a perspective view illustrating driving of an actuator 100 according to a fourteenth embodiment of the present invention.

A size of a first unit cell 111 or a second unit cell 121 of the actuator 100 according to the fourteenth embodiment of the present invention may vary. That is, in a loop type knit structure of the first unit cell 111 or the second unit cell 121, a size of a loop may vary. The first unit cell 111 or the second unit cell 121 including a loop having a large radius may be large in degree to which the first unit cell 111 or the second unit cell 121 expands or shrinks. The first unit cell 111 or the second unit cell 121 including a loop having a small radius may be small in degree to which the first unit cell 111 or the second unit cell 121 expands or shrinks. Therefore, an expansion or shrinkage degree of the first unit cell 111 or the second unit cell 121 may be variably adjusted, and thus, an expansion or shrinkage degree of the actuator 100 may be variably adjusted.

Embodiment 15

Figure 31:
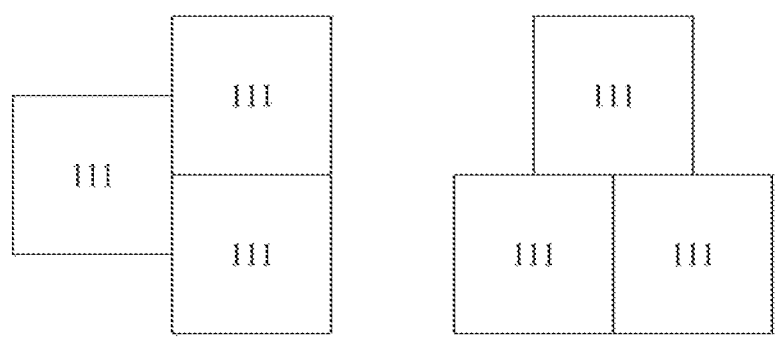
FIG. 31 is a perspective view illustrating driving of an actuator according to a fifteenth embodiment of the present invention.

FIG. 31 is a perspective view illustrating driving of an actuator 100 according to a fifteenth embodiment of the present invention.

In the actuator 100 according to the fifteenth embodiment of the present invention, arrangement of first unit cells 111 in a first area 110 or arrangement of second unit cells 121 in a second area 120 may be changed. If the first area 110 or the second area 120 has a certain area, an interval between the first unit cells 111 or the second unit cells 121 may be narrow in a direction where the first unit cells 111 in the first area 110 or the second unit cells 121 in the second area 120 are densely arranged. Also, if the first area 110 or the second area 120 has a certain area, the interval between the first unit cells 111 or the second unit cells 121 may be wide in a direction where the first unit cells 111 in the first area 110 or the second unit cells 121 in the second area 120 are sparsely arranged. Accordingly, the interval between the first unit cells 111 or the second unit cells 121 may be variably adjusted, and thus, an expansion or shrinkage degree of the actuator 100 may be variably adjusted.

Embodiment 16

Figure 32:
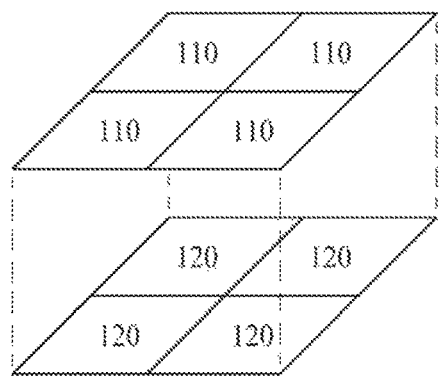
FIGS. 32 and 33 are perspective views illustrating driving of an actuator according to a sixteenth embodiment of the present invention.
Figure 33:
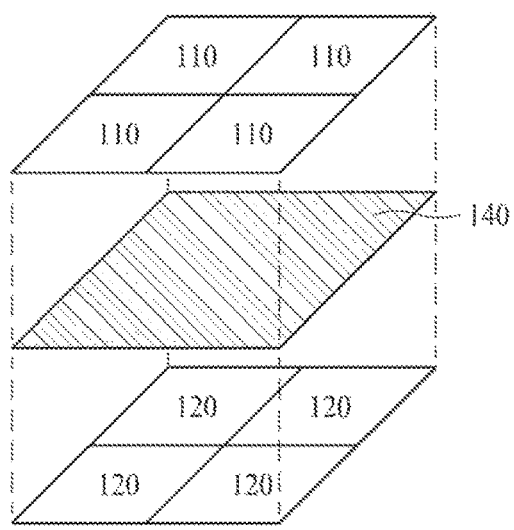

FIGS. 32 and 33 are perspective views illustrating driving of an actuator according to a sixteenth embodiment of the present invention.

The actuator according to the sixteenth embodiment of the present invention may have a structure where two or more patches are vertically disposed. Each of the patches may be configured with one or more first areas 110 or second areas 120. In FIG. 32, an example where two patches are provided is illustrated. However, the present embodiment is not limited thereto, and if more patches are provided, a structure illustrated in FIG. 32 may be repeated. Also, an example where a patch disposed in an upper portion is configured with the first area 110 and a patch disposed in a lower portion is configured with the second area 120 is illustrated in FIG. 32. However, the present embodiment is not limited thereto. In other embodiments, the patch disposed in the upper portion may be configured with the second area 120, and the patch disposed in the lower portion may be configured with the first area 110. Also, an example where each of the patches is configured with four first areas 110 or second areas 120 is illustrated in FIG. 32. However, the present embodiment is not limited thereto, and each patch may be configured with fewer or more first areas 110 or second areas 120.

In this case, vertically adjacent patches may have different kinds of areas. If a patch disposed in an upper portion is configured with the first area 110, a patch disposed in a lower portion may be configured with the second area 120. If the patch disposed in the upper portion is configured with the second area 120, the patch disposed in the lower portion may be configured with the first area 110. A twisting direction of a loop configured by a smart material 10 in the first area 110 may be opposite to a twisting direction of a loop configured by a smart material 10 in the second area 120. Therefore, loops of vertically adjacent patches may have opposite twisting directions.

Therefore, vertically adjacent patches are morphed in opposite directions. As described above, the first area 110 is morphed in a first direction, and the second area 120 is morphed in a second direction opposite to the first direction. Vertically adjacent patches included in the actuator according to the sixteenth embodiment of the present invention may be morphed in opposite directions and may be morphed in various shapes.

Moreover, the actuator according to the sixteenth embodiment of the present invention may morph only some patches of two or more patches.

If the actuator according to the sixteenth embodiment of the present invention is driven by a temperature or heat, the actuator may further include a radiating layer 140 between vertically adjacent patches.

The radiating layer 140 may be disposed between vertically adjacent patches. The radiating layer 140, as in FIG. 33, may be spaced apart from each patch by a certain interval or may be disposed adjacent to one patch. The radiating layer 140 may be formed of a material which is low in thermal conductivity.

In a case where the actuator according to the sixteenth embodiment of the present invention is driven by an electrical signal, the actuator may further include an insulation layer between vertically adjacent patches.

The insulation layer may be disposed between vertically adjacent patches. The insulation layer may be spaced apart from each patch by a certain interval or may be disposed adjacent to one patch. The insulation layer may be formed of a material which is low in thermal conductivity.

In the actuator according to the sixteenth embodiment of the present invention, the radiating layer 140 or the insulation layer prevents heat or an electrical signal from being transferred between vertically adjacent patches. Therefore, the radiating layer 140 or the insulation layer may allow heat or an electrical signal to be transferred to only one of the vertically adjacent patches. Accordingly, the actuator according to the sixteenth embodiment of the present invention may be partially driven so that only one of the vertically adjacent patches is driven, or the morphing degrees of the patches are differently set.

Embodiment 17

Figure 34:
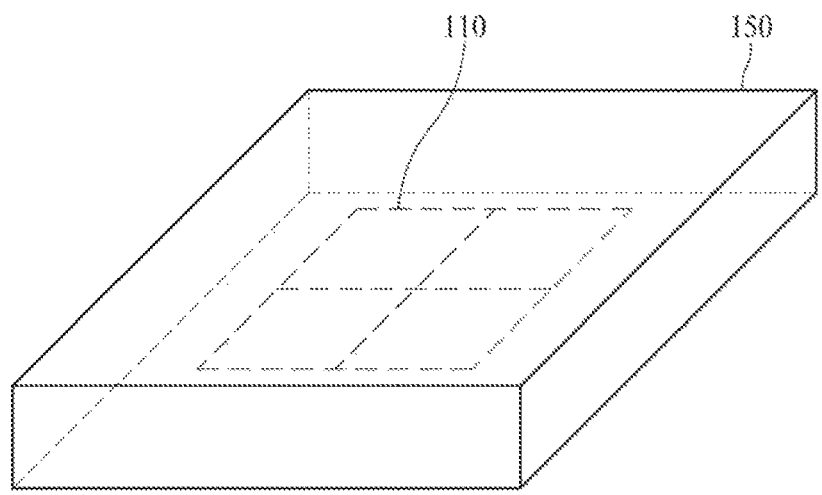
FIGS. 34 and 35 are perspective views illustrating driving of an actuator according to a seventeenth embodiment of the present invention.
Figure 35:
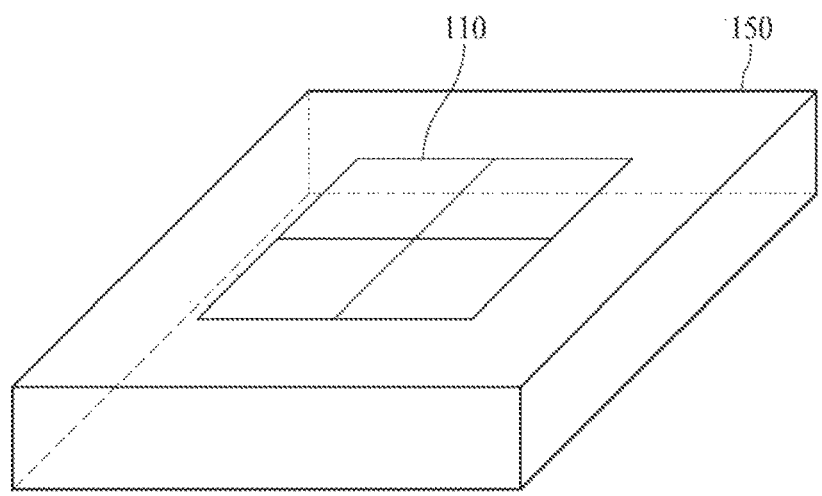

FIGS. 34 and 35 are perspective views illustrating driving of an actuator according to a seventeenth embodiment of the present invention. The actuator according to the seventeenth embodiment of the present invention may further include a three-dimensional elastic member 150.

The three-dimensional elastic member 150 may have a three-dimensional shape having volume. In FIGS. 34 and 35, an example where the three-dimensional elastic member 150 has a rectangular parallelepiped shape is illustrated. However, the present embodiment is not limited thereto, and the three-dimensional elastic member 150 may have a three-dimensional shape including a polyhedron or a curved surface. The three-dimensional elastic member 150 may be a non-metal material or a polymer having flexibility. The three-dimensional elastic member 150 may include an empty space, such as a gap or a hole, which is provided therein, and thus, may shrink by using the empty space or increase a volume of the empty space, thereby increasing a whole volume of three-dimensional elastic member 150.

A patch, as in FIG. 34, may be inserted into the three-dimensional elastic member 150. Alternatively, as in FIG. 35, the patch may be attached on a surface of the three-dimensional elastic member 150. In FIGS. 34 and 35, an example where the patch is configured with a first area 110 is illustrated. However, the present embodiment is not limited thereto, and the patch may be configured with a second area 120. When heat or an electrical signal is applied to the patch, the patch may be morphed, and thus, the three-dimensional elastic member 150 may be morphed together with the patch. Accordingly, the three-dimensional elastic member 150 having volume may be morphed by using morphing of the patch having a planar shape, and thus, the actuator may be morphed or driven in various shapes.

Embodiment 18

Figure 36:
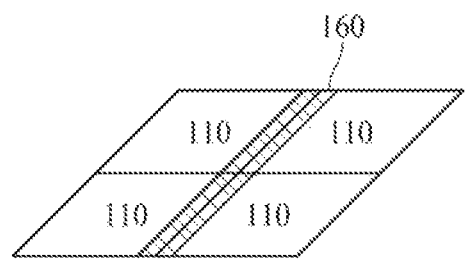
FIG. 36 is a perspective view illustrating driving of an actuator according to an eighteenth embodiment of the present invention.

FIG. 36 is a perspective view illustrating driving of an actuator according to an eighteenth embodiment of the present invention. The actuator according to the eighteenth embodiment of the present invention may further include a tension wire 160.

The tension wire 160 may be a string which is strong in tension and is thicker in thickness than general wires. The tension wire 160 may be formed of a material which is strong in tension. The tension wire 160 may be disposed on a patch. In FIG. 36, an example where the tension wire 160 is disposed on a boundary line between first areas 110 of the patch is illustrated. However, the present embodiment is not limited thereto. In other embodiments, if the patch is configured with a plurality of second areas 120, the tension wire 160 may be disposed on a boundary line between the second areas 120.

The tension wire 160 may partially suppress morphing of the patch. When heat or an electrical signal is applied to the patch, a portion of the patch linked to the tension wire 160 may be relatively less morphed in morphing of the patch. Therefore, driving of the actuator may be partially suppressed, and thus, may be realized in various shapes.

Embodiment 19

Figure 37:
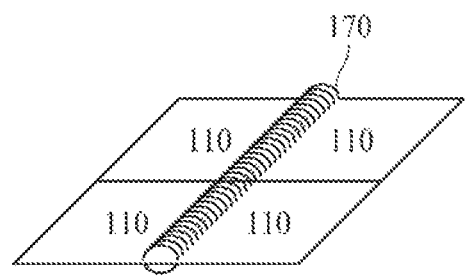
FIG. 37 is a perspective view illustrating driving of an actuator according to a nineteenth embodiment of the present invention.

FIG. 37 is a perspective view illustrating driving of an actuator according to a nineteenth embodiment of the present invention. The actuator according to the nineteenth embodiment of the present invention may further include an elastic member 170.

The elastic member 170 may be formed of all kinds of members having elasticity. The elastic member 170 may be formed of a spring or an elastic line which is good in elastic force. If the elastic member 170 is the spring, a material of the spring may be metal or an alloy which is good in elastic force. If the elastic member 170 is the elastic line, a material of the elastic line may be rubber or a non-metal polymer material which is good in elastic force. The elastic member 170 may be disposed on a patch. In FIG. 37, an example where the elastic member 170 is disposed on a boundary line between first areas 110 of the patch is illustrated. However, the present embodiment is not limited thereto. In other embodiments, if the patch is configured with a plurality of second areas 120, the elastic member 170 may be disposed on a boundary line between the second areas 120.

When the patch is morphed by applying heat or an electrical signal to the patch, the elastic member 170 may be driven along with the patch without suppressing driving of the patch. If the heat or the electrical signal is not applied to the patch, the elastic member 170 may quickly return to an original shape. Also, when the actuator is not driven, the elastic member 170 may maintain the original shape.

Embodiment 20

Figure 38:
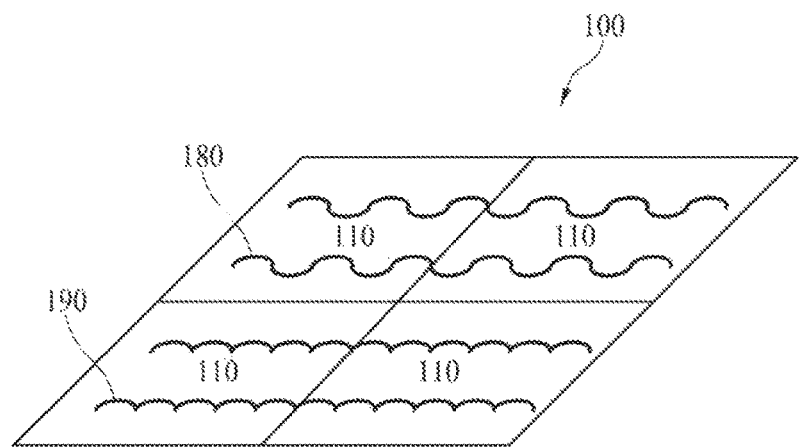
FIG. 38 is a perspective view illustrating driving of an actuator according to a twentieth embodiment of the present invention.
Figure 39:
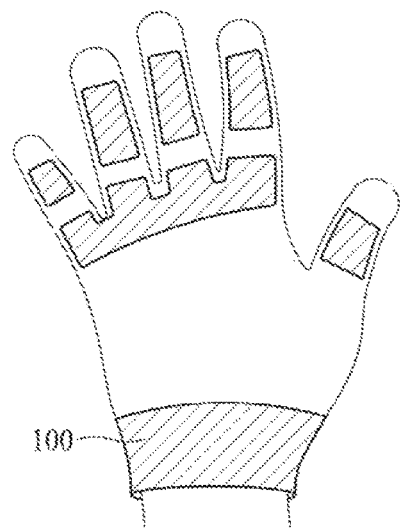
FIGS. 39 to 50 are exemplary diagrams illustrating an example where an actuator according to the present invention is applied.
Figure 40:
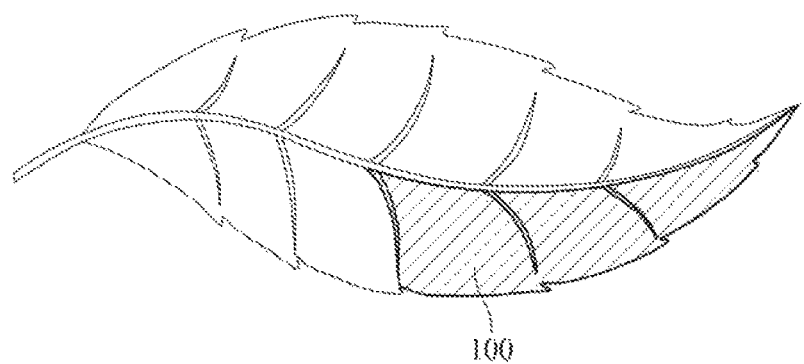
Figure 41:
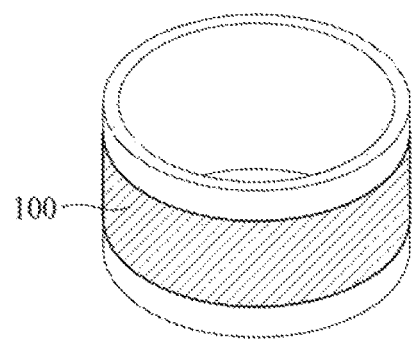
Figure 42:
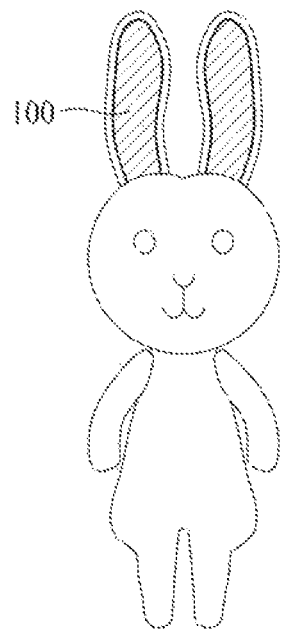
Figure 43:
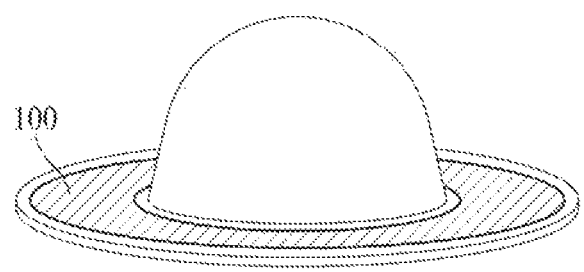
Figure 44:
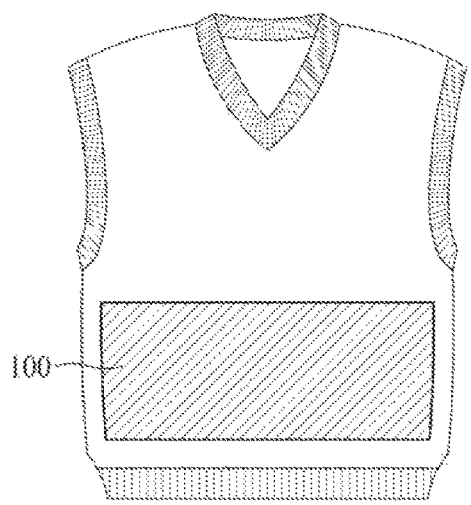
Figure 45:
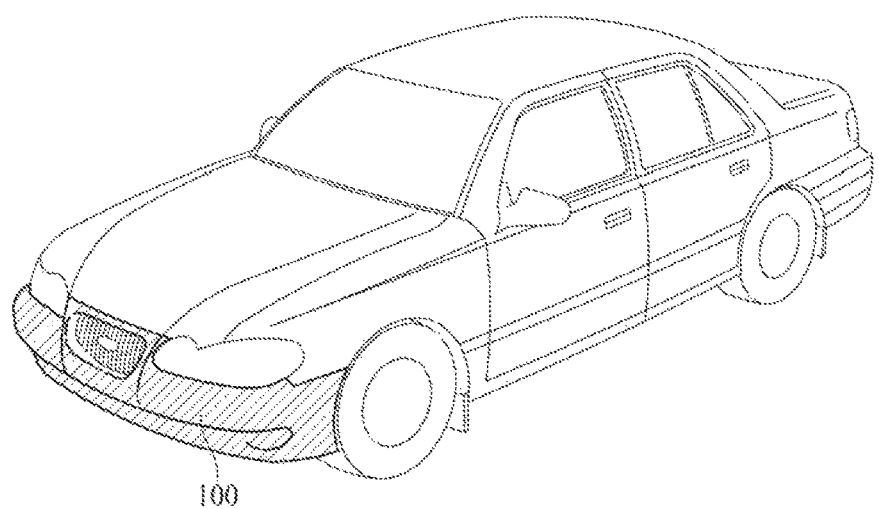
Figure 46:
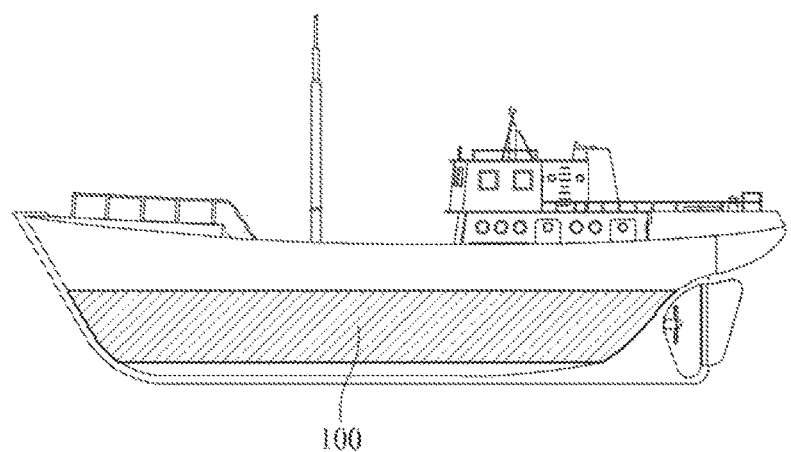
Figure 47:
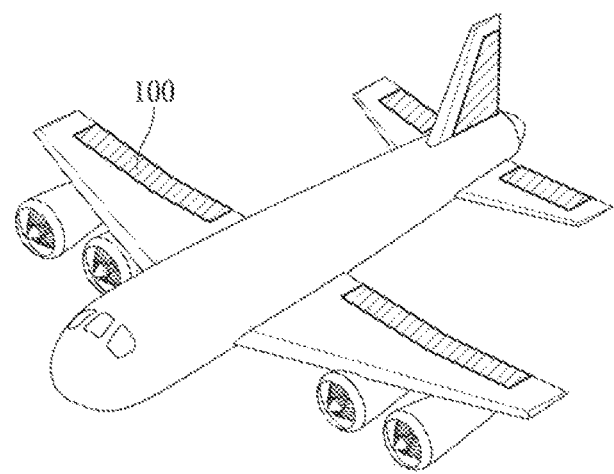
Figure 48:
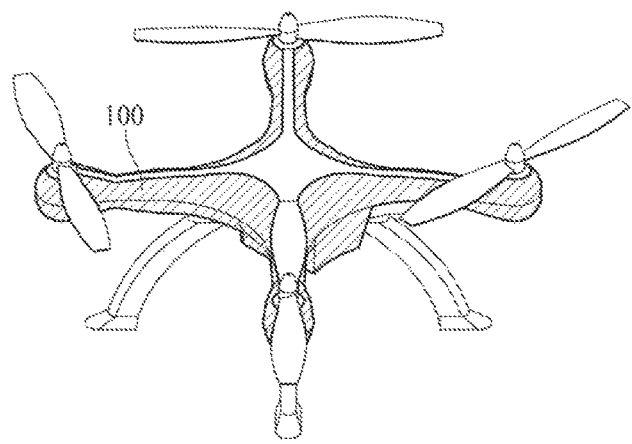
Figure 49:
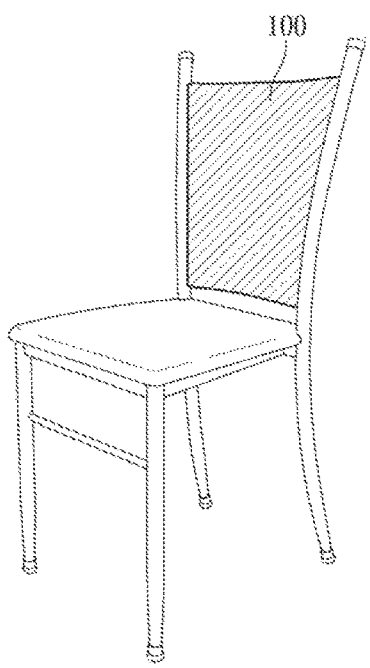
Figure 50:
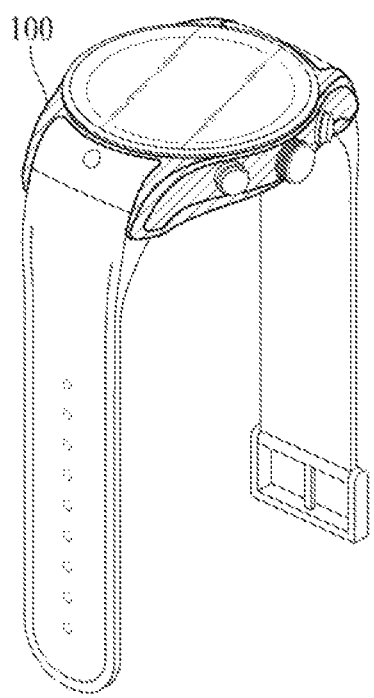

FIG. 38 is a perspective view illustrating driving of an actuator according to a nineteenth embodiment of the present invention. The actuator according to the nineteenth embodiment of the present invention may further include a first knitting pattern 180 and a second knitting pattern 190.

The first knitting pattern 180 is formed on a plurality of first areas 110. The first knitting pattern 180 may be disposed on a patch. In FIG. 38, an example where the first knitting pattern 180 is disposed on a plurality of first areas 110 of the patch is illustrated. However, the present embodiment is not limited thereto. In other embodiments, if the patch is configured with a plurality of second areas 120, the first knitting pattern 180 may be disposed on a plurality of second areas 120.

The second knitting pattern 190 is formed on a plurality of first areas 110. The second knitting pattern 190 may be disposed on a patch. In FIG. 38, an example where the second knitting pattern 190 is disposed on a plurality of first areas 110 of the patch is illustrated. However, the present embodiment is not limited thereto. In other embodiments, if the patch is configured with a plurality of second areas 120, the second knitting pattern 190 may be disposed on a plurality of second areas 120.

The first knitting pattern 180 is connected by one wire. The first knitting pattern 180 is formed by passing through the first area 110 from upside to downside, and from downside to upside. The first knitting pattern 180 creates a sinusoidal wave form on the first area 110.

The second knitting pattern 190 is severed in pieces. The second knitting pattern 190 is formed by ejecting parts of wire from the first area 110. The second knitting pattern 190 creates form which has several peaks of mountain on the first area 110.

The first knitting pattern 180 and the second knitting pattern 190 can have different changing direction compared to the changing direction of the first area 110. So, the first area 110 can change its shape into two directions. By this feature, the first area 110 can represent additional changing patterns and make various shapes.

The actuator according to the embodiments of the present invention, as in FIG. 39 to FIG. 50, may be variously applied to fields such as gloves, sculptures, pressure bands, dolls, caps, waistcoats, vehicles, etc.

In a case where the actuator according to an embodiment of the present invention is applied to clothes such as gloves, caps, and waistcoats, the actuator according to an embodiment of the present invention may be applied to a joint part which enables a human body to move in gloves, waistcoats, etc., and thus, the gloves may be bent in a more flexible shape. Alternatively, caps and the like may be usually kept in small volume, and when the caps are used, by applying heat or an electrical signal to the caps, the caps may be spread and used.

In a case where the actuator according to an embodiment of the present invention is applied to sculptures or dolls, petals and/or the like in the sculptures may be automatically shrunk or unfolded according to the heat or the electrical signal, or the dolls may automatically move according to the heat or the electrical signal.

In a case where the actuator according to an embodiment of the present invention is applied to pressure bands, in order for the pressure bands to pressurize an injured part with a continuous force for a certain time, the actuator may maintain a certain shape and may apply a certain force to the injured part.

In a case where the actuator according to an embodiment of the present invention is applied to vehicles like car, ship, drone, or watch, a shape of the actuator is morphed as it is used in driving part or can be affected by outer impact. The actuator may be restored to an original shape according to the heat or the electrical signal, and thus, may be used as a shape memory material for example.

In a case where the actuator according to an embodiment of the present invention is applied to a chair, the actuator can be used to restore its original shape when not used, and change its shape that fits to each user when different user uses that chair.

As described above, according to the embodiments of the present invention, the third to fifth patterns which cannot be predicted through the predetermined first and second patterns or a simple combination thereof may be generated according to an external signal. Accordingly, a shape may be freely morphed in regard to a structure or a shape, and thus, various complex structures may be generated and realized, thereby providing the loop linked smart morphing actuator.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A loop linked smart morphing actuator comprising:
a first area morphed in a first pattern according to an external signal; and
a second area morphed in a second pattern according to the external signal,
wherein
the first area comprises a first unit cell morphed in a first direction,
the first unit cell is configured in a loop type knit structure including a first wire and a second wire, the second area comprises a second unit cell morphed in a second direction, and the second unit cell is configured in a loop type knit structure including a third wire and a fourth wire, and
the second direction is opposite to the first direction, and the second pattern is a pattern which has a symmetrical relationship with the first pattern and is provided opposite to the first pattern.

2. The loop linked smart morphing actuator of claim 1, wherein the first to fourth wires include a smart material morphed in predetermined shape according to a temperature change and a covering material surrounding an outer portion of the smart material, and the first to fourth wires comprise the same material and are linked to each other.

3. The loop linked smart morphing actuator of claim 1, wherein the actuator is an open type and is morphed in a third pattern, which differs from the first and second patterns, according to the external signal.

4. The loop linked smart morphing actuator of claim 3, wherein a portion of the third pattern comprises the first pattern or the second pattern.

5. The loop linked smart morphing actuator of claim 3, wherein a whole portion of the third pattern does not include the first pattern or the second pattern.

6. The loop linked smart morphing actuator of claim 1, wherein the actuator is an open type, the first area and the second area are alternately arranged in a horizontal direction parallel to an arrangement direction of the first wire and the second wire, and repetitive flections are provided in the horizontal direction according to the external signal.

7. The loop linked smart morphing actuator of claim 1, wherein the actuator is an open type, the first area and the second area are alternately arranged in a vertical direction vertical to an arrangement direction of the first wire and the second wire, a length in the vertical direction decreases according to the external signal, and a length in a horizontal direction perpendicular to the vertical direction is reduced.

8. The loop linked smart morphing actuator of claim 1, wherein the actuator is an open type, the first area and the second area are alternately arranged in a horizontal direction and a vertical direction with respect to an arrangement direction of the first wire and the second wire, a plurality of the first areas are arranged in a first diagonal direction, and a plurality of the second areas are arranged in a second diagonal direction, and a center portion expands as an edge shrinks to the center portion according to the external signal.

9. The loop linked smart morphing actuator of claim 1, wherein the actuator is a closed type and is morphed in a fourth pattern or a fifth pattern, which differs from the first and second patterns, according to the external signal.

10. The loop linked smart morphing actuator of claim 9, wherein a whole portion of the fourth pattern or the fifth pattern does not include the first pattern or the second pattern.

11. The loop linked smart morphing actuator of claim 1, wherein the actuator is a closed type, the first area and the second area are alternately arranged in a vertical direction vertical to an arrangement direction of the first wire and the second wire, and an upper side and a lower side are adhered to each other or a left side and a right side are adhered to each other, whereby a height is reduced according to the external signal.

12. The loop linked smart morphing actuator of claim 1, wherein the actuator is a closed type, the first area and the second area are alternately arranged in a horizontal direction parallel to an arrangement direction of the first wire and the second wire, and an upper side and a lower side are adhered to each other, whereby repetitive flections are provided in a vertical direction perpendicular to the horizontal direction according to the external signal.

13. The loop linked smart morphing actuator of claim 1, wherein the actuator is a closed type, the first area and the second area are alternately arranged in a horizontal direction and a vertical direction with respect to an arrangement direction of the first wire and the second wire, and a left side and a right side are adhered to each other, whereby deformation, where a side surface is bent or rolled in a first diagonal direction or a second diagonal direction according to the external signal and is morphed in a spiral shape including flections, occurs.

14. The loop linked smart morphing actuator of claim 1, wherein the actuator is a closed type, the first area and the second area are alternately arranged in a horizontal direction parallel to an arrangement direction of the first wire and the second wire, and a left side and a right side are adhered to each other, whereby deformation, where as a side surface shrinks with respect to a center axis according to the external signal, the actuator is morphed to have a figure including a curve where a top and a bottom are recessed with respect to the center axis.

15. The loop linked smart morphing actuator of claim 1, wherein the actuator is a closed type, the first area and the second area are alternately arranged in a horizontal direction and a vertical direction with respect to an arrangement direction of the first wire and the second wire, and a left side and a right side are adhered to each other, whereby deformation, where a side surface irregularly expands according to the external signal and flections are irregularly provided on the side surface, occurs.

16. The loop linked smart morphing actuator of claim 1, further comprising an external signal input unit applying the external signal to some areas of a plurality of the first areas and a plurality of the second areas so that the external signal is applied to the some areas of the plurality of first areas and the plurality of second areas.

17. The loop linked smart morphing actuator of claim 1, wherein the actuator is a closed type and further comprises a third area between the first area and the second area.

18. The loop linked smart morphing actuator of claim 17, wherein the third area is configured in one of a single wire structure, a support structure, and a fabric structure which differs from a knit structure of the first area or the second area.

19. The loop linked smart morphing actuator of claim 1, wherein loop type knit structures are arranged in a first diagonal direction or a second diagonal direction in some areas of a plurality of the first areas and a plurality of the second areas, and the actuator is twisted and bent or rolled in the first diagonal direction or the second diagonal direction and is morphed in a twisted cylindrical shape.

20. The loop linked smart morphing actuator of claim 1, wherein at least ones of a plurality of the first areas or a plurality of the second areas are stacked as a plurality of layers.

* * * * *